US009871989B2

(12) United States Patent
Matsuda

(10) Patent No.: US 9,871,989 B2
(45) Date of Patent: *Jan. 16, 2018

(54) COMMUNICATION APPARATUS AND METHOD OF CONTROLLING COMMUNICATION APPARATUS

(71) Applicant: CANON KABUSHIKI KAISHA, Tokyo (JP)

(72) Inventor: Jun Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,417

(22) Filed: Jan. 11, 2017

(65) Prior Publication Data

US 2017/0127007 A1 May 4, 2017

Related U.S. Application Data

(63) Continuation of application No. 15/131,261, filed on Apr. 18, 2016, now Pat. No. 9,578,202, which is a continuation of application No. 14/141,802, filed on Dec. 27, 2013, now Pat. No. 9,344,685.

(30) Foreign Application Priority Data

Dec. 28, 2012 (JP) ................................. 2012-288558

(51) Int. Cl.
*H04N 7/173* (2011.01)
*H04N 5/232* (2006.01)
*H04N 5/38* (2006.01)

(52) U.S. Cl.
CPC ........... *H04N 5/38* (2013.01); *H04N 5/23293* (2013.01)

(58) Field of Classification Search
CPC .......... H04N 1/00204; H04N 5/23203; H04N 5/523206; H04N 5/23222; H04N 7/185; H04N 21/4223
USPC ...... 348/207.1, 207.11, 211.99, 211.1–211.4, 348/211.11
See application file for complete search history.

(56) References Cited

U.S. PATENT DOCUMENTS

| 7,468,744 | B2 * | 12/2008 | Edwards | ............ | H04N 1/00209 348/207.1 |
| 8,004,593 | B2 * | 8/2011 | Kusaka | .............. | H04N 1/00315 348/211.1 |
| 8,259,186 | B2 * | 9/2012 | Kiyoshige | .......... | H04N 1/00413 348/211.99 |

(Continued)

*Primary Examiner* — Kelly L Jerabek
(74) *Attorney, Agent, or Firm* — Cowan, Liebowitz & Latman, P.C.

(57) ABSTRACT

A communication apparatus is connected to an external apparatus in a connection mode selected from a plurality of connection modes including a first connection mode in which an external apparatus is connected in accordance with a predetermined operation on the communication apparatus and a second connection mode in which an external apparatus is connected in accordance with an operation whose operation amount is smaller than the predetermined operation. The communication apparatus has a plurality of operation modes to select at least one of contents saved in a recording medium. When connecting the external apparatus in the second connection mode, an operation mode in which the contents are selected based on the operation on the external apparatus is selected out of the plurality of operation modes.

26 Claims, 15 Drawing Sheets

(56) References Cited

U.S. PATENT DOCUMENTS

| | | | | |
|---|---|---|---|---|
| 8,854,484 | B2* | 10/2014 | Takagi | H04N 5/232 |
| | | | | 348/211.3 |
| 9,344,685 | B2* | 5/2016 | Matsuda | H04N 7/183 |
| 9,578,202 | B2* | 2/2017 | Matsuda | H04N 7/183 |
| 2005/0198213 | A1* | 9/2005 | Watanabe | H04N 5/232 |
| | | | | 709/219 |
| 2006/0023069 | A1* | 2/2006 | Saito | H04N 5/23293 |
| | | | | 348/207.99 |
| 2006/0203097 | A1* | 9/2006 | Koga | H04N 5/23203 |
| | | | | 348/211.3 |
| 2009/0040331 | A1* | 2/2009 | Kitagawa | H04N 1/00204 |
| | | | | 348/222.1 |
| 2010/0172291 | A1* | 7/2010 | Kim | H04W 48/20 |
| | | | | 370/328 |
| 2012/0081556 | A1* | 4/2012 | Hwang | H04N 1/00411 |
| | | | | 348/207.1 |
| 2012/0099476 | A1* | 4/2012 | Mahaffy | H04L 67/16 |
| | | | | 370/254 |
| 2014/0022980 | A1* | 1/2014 | Matsuda | H04W 48/18 |
| | | | | 370/315 |

* cited by examiner

F I G. 2
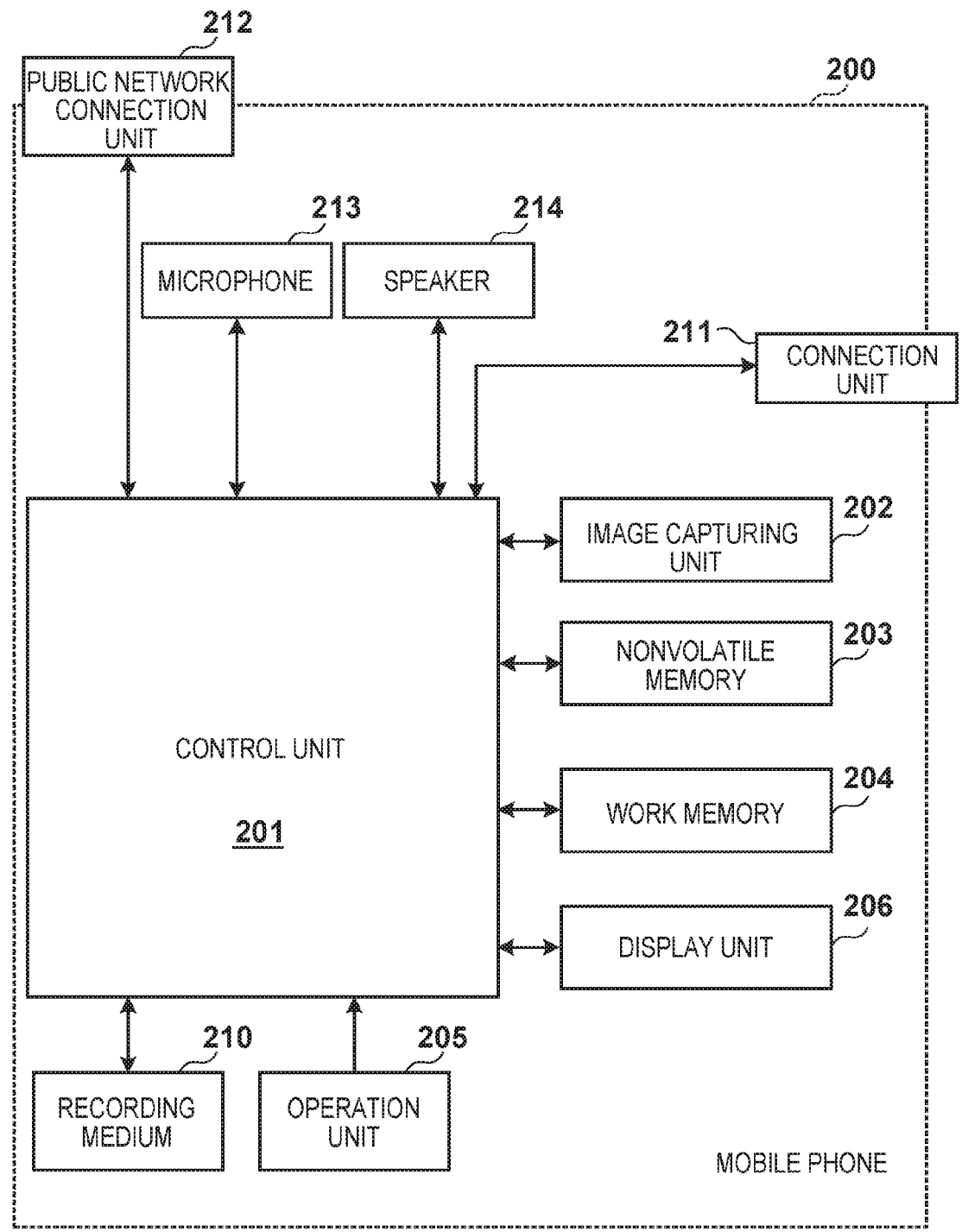

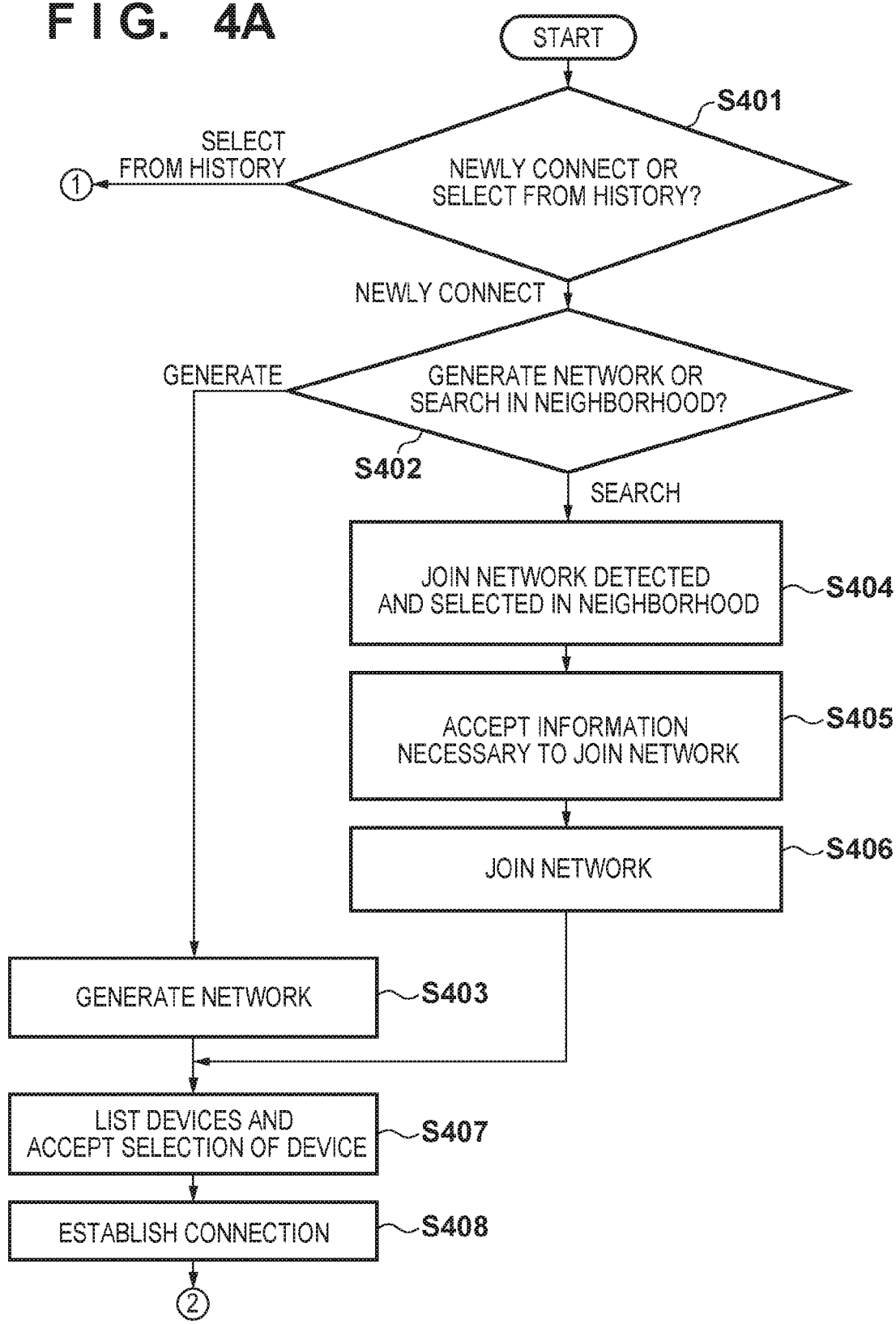

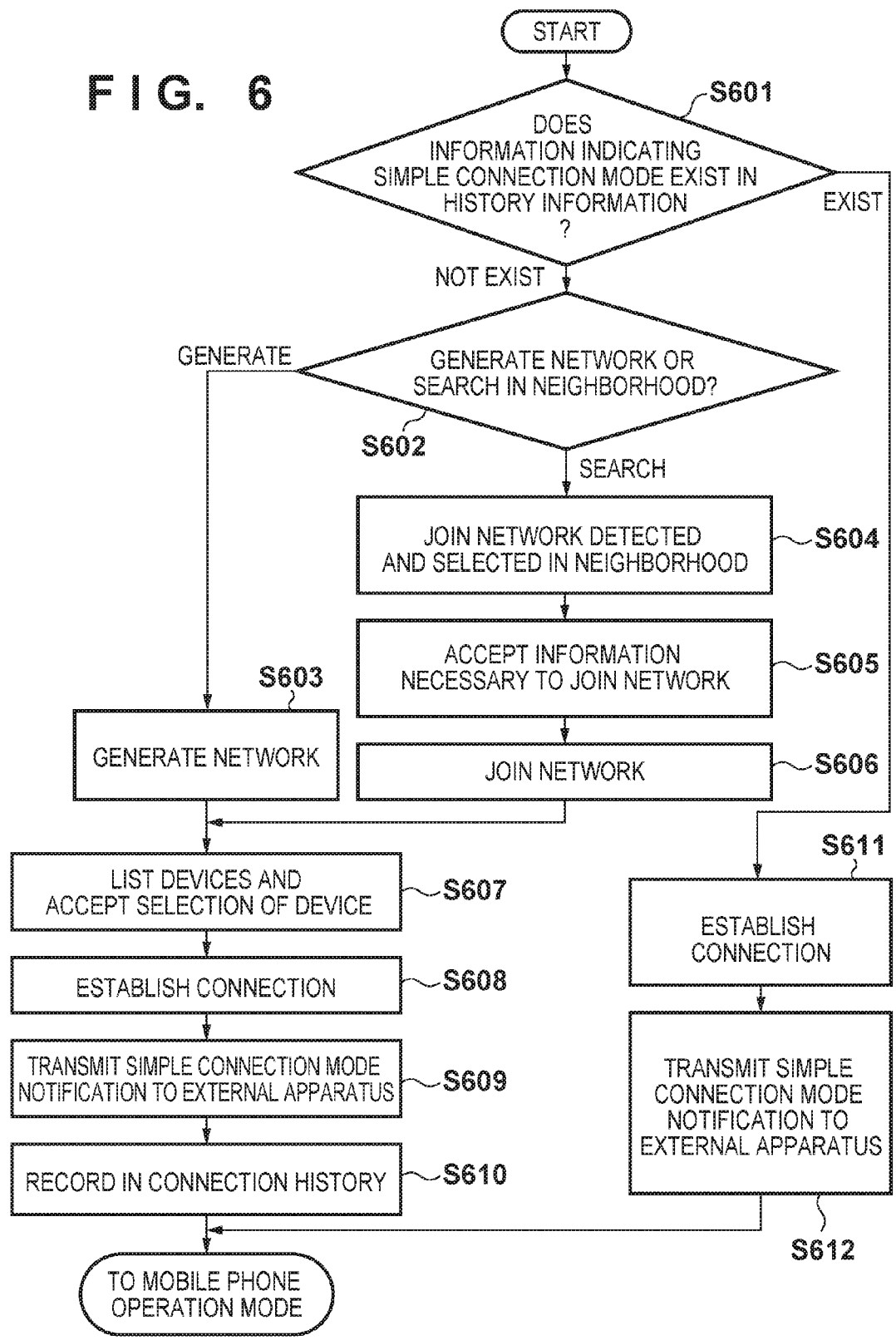

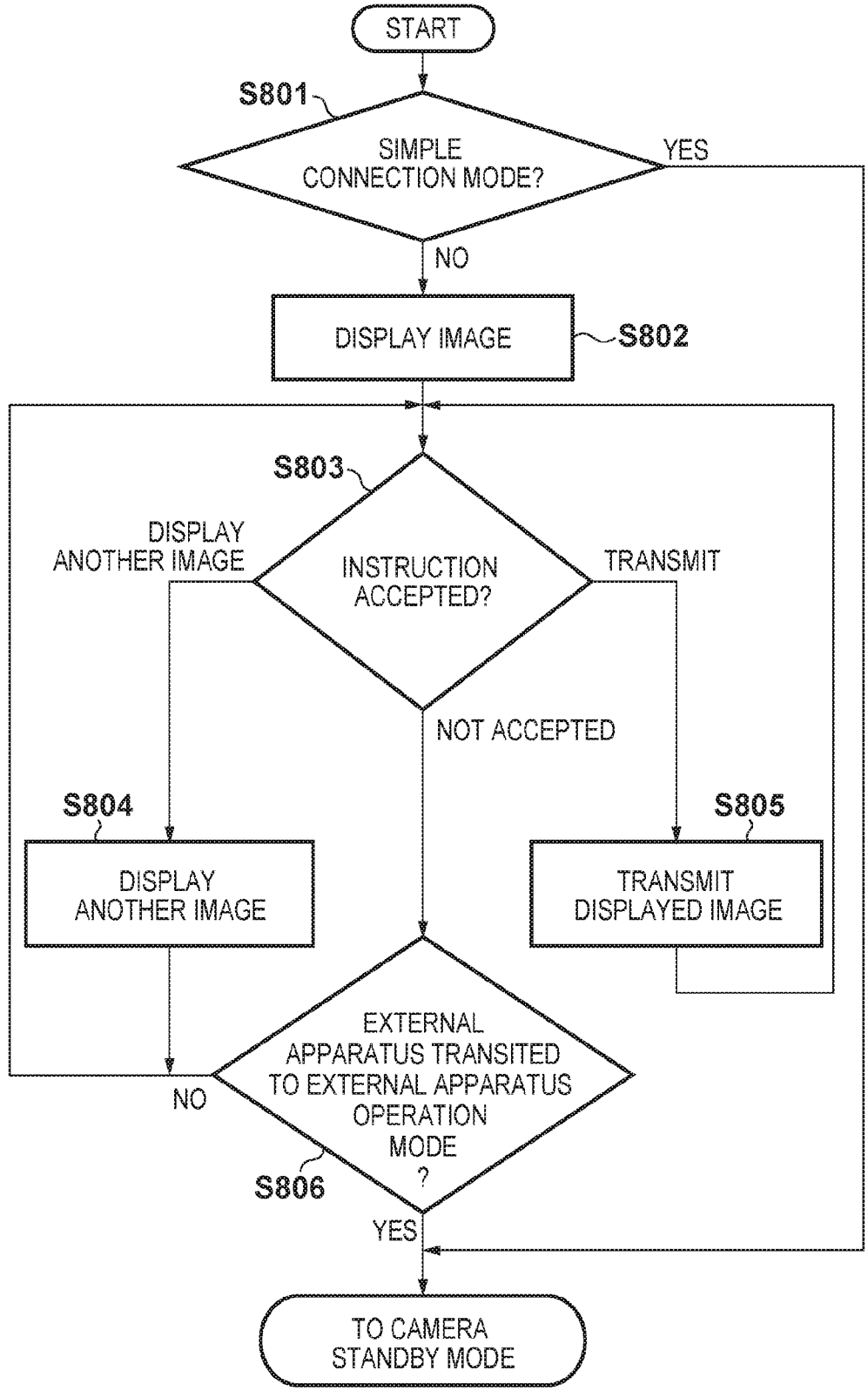

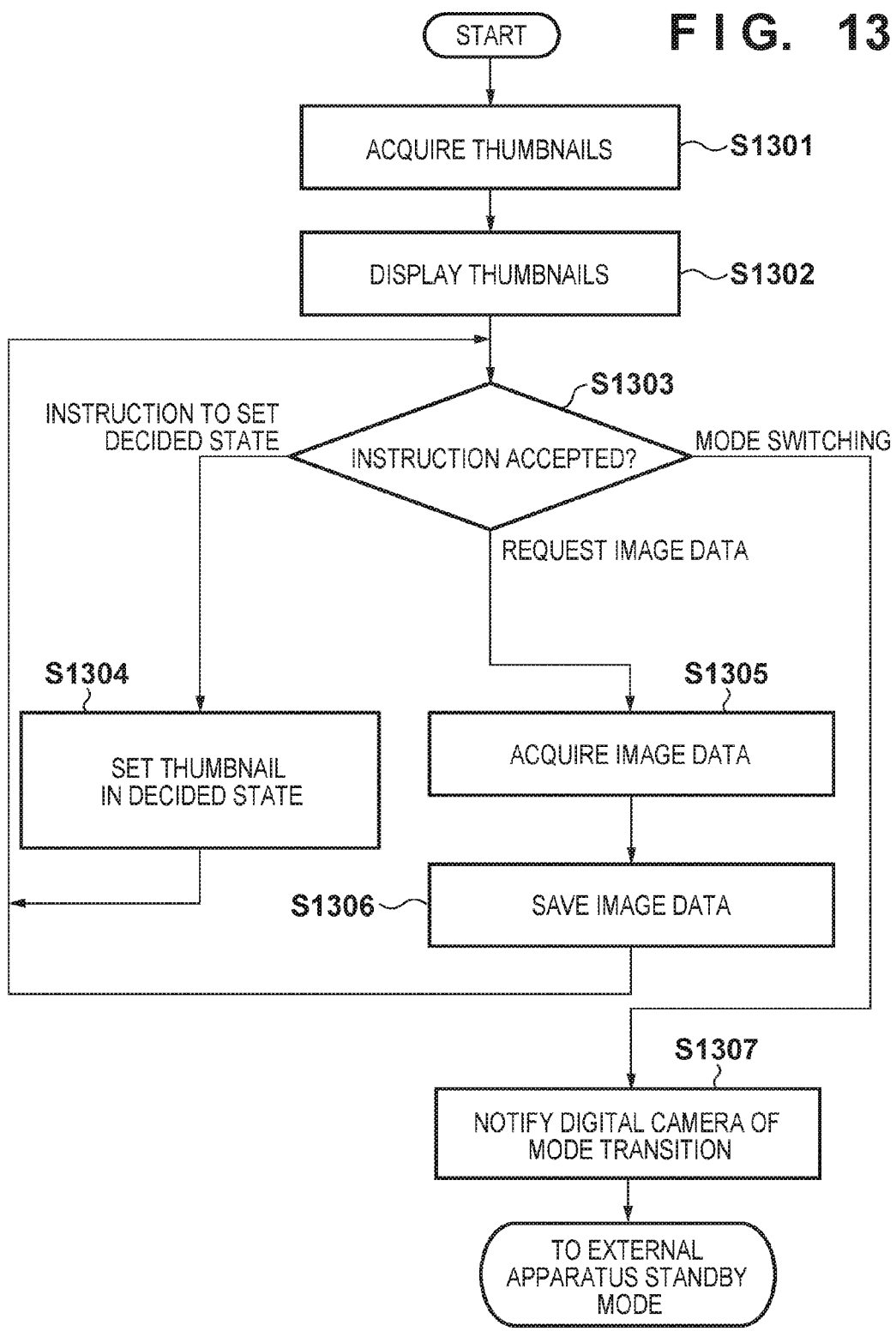

COMMUNICATION APPARATUS AND METHOD OF CONTROLLING COMMUNICATION APPARATUS

CROSS-REFERENCE TO RELATED APPLICATIONS

This application is a continuation of application Ser. No. 15/131,261, filed Apr. 18, 2016, which is a continuation of application Ser. No. 14/141,802, filed Dec. 27, 2013, which issued as U.S. Pat. No. 9,344,685 on May 17, 2016, the entire disclosures of which is hereby incorporated by reference.

BACKGROUND OF THE INVENTION

Field of the Invention

The present invention relates to a communication apparatus and method of controlling a communication apparatus that is connected to another device.

Description of the Related Art

Apparatuses for implementing a content transmission system, which transmits a content from one apparatus to another apparatus by a wireless communication function, have recently been introduced into the market. There is known, for example, a digital camera having a wireless communication function and capable of wirelessly transmitting image data obtained by shooting to an external apparatus. The following two methods are considerable to select a content (image data) to be transmitted from such a digital camera to an external apparatus. In one method, image data to be transmitted to the external apparatus is selected on the digital camera side. In the other method, image data in the digital camera are opened to the external apparatus, and image data to be acquired is selected on the external apparatus side. Japanese Patent Laid-Open No. 2009-44251 (to be referred to as literature 1 hereinafter) discloses a digital camera that allows a user to select which one of the methods should be used.

In the technique disclosed in literature 1 described above, however, every time the camera is connected to the external apparatus, the user needs to select, on the camera side, whether to open image data, that is, whether to permit the external apparatus to select images in the camera.

SUMMARY OF THE INVENTION

One embodiment of the present invention saves a user from performing user operations associated with content transmission when connecting a specific external apparatus as a content transmission destination.

According to one aspect of the present invention, there is provided a communication apparatus comprising: a connection unit to be connected to an external apparatus in a connection mode selected from a plurality of connection modes, the plurality of connection modes including a first connection mode in which an external apparatus is connected in accordance with a predetermined operation on the communication apparatus and a second connection mode in which an external apparatus is connected in accordance with an operation whose operation amount is smaller than the predetermined operation performed on the communication apparatus to do connection in the first connection mode; a selection unit configured to select at least one of contents saved in a recording medium in one of a plurality of operation modes, the plurality of operation modes including a first operation mode in which a content is selected based on an operation on the communication apparatus and a second operation mode in which a content is selected based on an operation on an external apparatus; a transmission unit configured to transmit the selected content to the external apparatus; and a control unit configured to cause the selection unit to operate in the second operation mode when connecting the external apparatus in the second connection mode.

Also, According to another aspect of the present invention, there is provided a communication apparatus comprising: a connection unit to be connected to an external apparatus in a connection mode selected from a plurality of connection modes, the plurality of connection modes including a first connection mode in which an external apparatus is connected in accordance with a predetermined operation on the communication apparatus and a second connection mode in which an external apparatus registered in advance is connected in accordance with an operation whose operation amount is smaller than the predetermined operation performed on the communication apparatus to do connection in the first connection mode; a selection unit configured to select at least one of contents saved in a recording medium in one of a plurality of operation modes, the plurality of operation modes including a first operation mode in which a content is selected based on an operation on the communication apparatus and a second operation mode in which a content is selected based on an operation on an external apparatus; a transmission unit configured to transmit the selected contents to the external apparatus; and a control unit configured to cause the selection unit to operate in one of the first operation mode and the second operation mode when connecting the external apparatus in the first connection mode, and cause the selection unit to operate in the second operation mode when connecting the external apparatus in the second connection mode.

Furthermore, according to another aspect of the present invention, there is provided a communication apparatus comprising: a connection unit to be connected to an external apparatus; a selection unit configured to select at least one of contents saved in a recording medium in one of a plurality of operation modes, the plurality of operation modes including a first operation mode in which the selection is done based on an operation on the communication apparatus and a second operation mode in which at least one of a contents saved in the recording medium is selected based on an operation on the external apparatus; a transmission unit configured to transmit the selected contents to the external apparatus; and a control unit configured to cause the selection unit to operate in the second connection mode when connecting, in accordance with a predetermined operation, the external apparatus registered in the communication apparatus in advance.

Furthermore, according to another aspect of the present invention, there is provided a method of controlling a communication apparatus, comprising: a connection step of connecting an external apparatus in a connection mode selected from a plurality of connection modes, the plurality of connection modes including a first connection mode in which an external apparatus is connected in accordance with a predetermined operation on the communication apparatus and a second connection mode in which an external apparatus is connected in accordance with an operation whose operation amount is smaller than the predetermined operation performed on the communication apparatus to do connection in the first connection mode; a selection step of selecting at least one of contents saved in a recording medium in one of a plurality of operation modes, the plurality of operation modes including a first operation mode in which a content is selected based on an operation on the communication apparatus and a second operation mode in which a content is selected based on an operation on an external apparatus; a transmission step of transmitting the selected contents to the external apparatus; and a control step of executing the second operation mode in the selection step when connecting the external apparatus in the second connection mode.

Furthermore, according to another aspect of the present invention, there is provided a method of controlling a communication apparatus, comprising: a connection step of connecting an external apparatus in a connection mode selected from a plurality of connection modes, the plurality of connection modes including a first connection mode in which an external apparatus is connected in accordance with a predetermined operation on the communication apparatus and a second connection mode in which an external apparatus registered in advance is connected in accordance with an operation whose operation amount is smaller than the predetermined operation performed on the communication apparatus to do connection in the first connection mode; a selection step of selecting at least one of contents saved in a recording medium in one of a plurality of operation modes, the plurality of operation modes including a first operation mode in which a content is selected based on an operation on the communication apparatus and a second operation mode in which a content is selected based on an operation on an external apparatus; a transmission step of transmitting the selected contents to the external apparatus; and a control step of performing an operation in the selection step while enabling switching of the operation mode when connecting the external apparatus in the first connection mode, and executing the second operation mode in the selection step when connecting the external apparatus in the second connection mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the arrangement of a mobile phone according to the embodiment;

FIGS. 4A and 4B are flowcharts showing connection processing of the digital camera in a normal connection mode;

FIG. 6 is a flowchart showing connection processing of the digital camera in a simple connection mode;

FIG. 8 is a flowchart showing the operation of the digital camera after connection;

FIG. 13 is a flowchart showing the operation of the mobile phone after connection.

DESCRIPTION OF THE EMBODIMENTS

The embodiments of the present invention will now be described in detail with reference to the accompanying drawings. Note that the embodiments to be explained below are merely examples of the implementation means of the present invention, and may appropriately be modified or changed in accordance with various conditions and the arrangement of the apparatus to which the present invention is applied. The embodiments can also appropriately be combined.

<Arrangement of Digital Camera>

Figure 1:
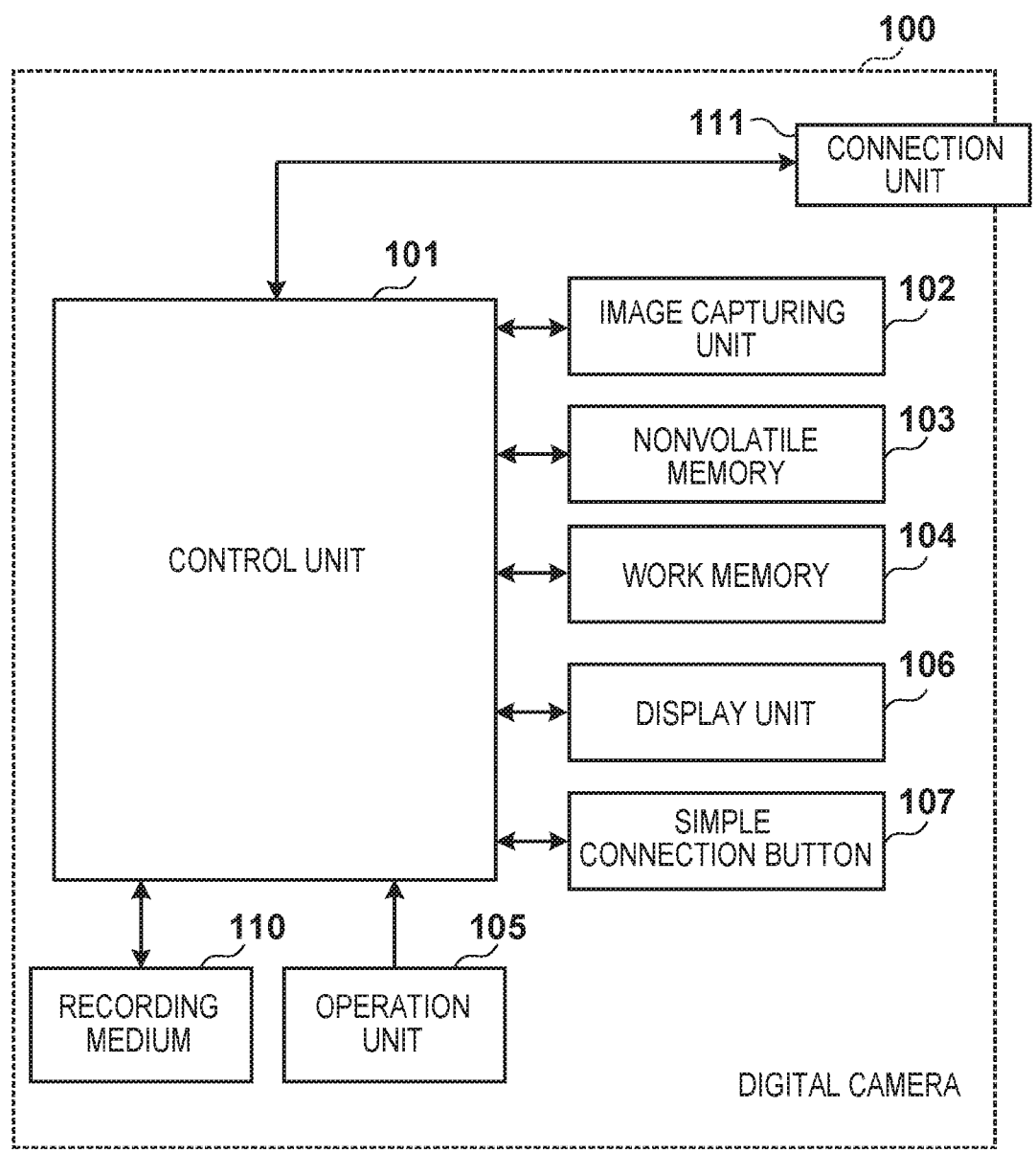
FIG. 1 is a block diagram showing an example of the arrangement of a digital camera according to the embodiment.

FIG. 1 is a block diagram showing an example of the arrangement of a digital camera 100 as an example of a content transmission apparatus that constitutes a content transmission system according to this embodiment. Note that although the digital camera will be explained here as an example of the content transmission apparatus, the content transmission apparatus is not limited to this. For example, the content transmission apparatus may be an information processing apparatus such as a mobile phone, a tablet device, or a personal computer, or an image capturing apparatus such as a mobile phone equipped with a camera. In addition, the content to be transmitted is not limited to image data and may be audio data or document data.

A control unit 101 controls the units of the digital camera 100 in accordance with input signals and programs to be described later. Note that instead of causing the control unit 101 to control the entire apparatus, a plurality of pieces of hardware may share the processing to control the entire apparatus. An image capturing unit 102 converts object light formed into an image via a lens included in the image capturing unit 102 into an electrical signal, performs noise reduction processing and the like, and outputs digital data as image data. The captured image data is stored in a buffer memory, undergoes predetermined arithmetic processing by the control unit 101, and is recorded in a recording medium 110.

A nonvolatile memory 103 is an electrically erasable/recordable nonvolatile memory, and stores, for example, programs (to be described later) which are executed by the control unit 101. A work memory 104 is used as a buffer memory that temporarily holds image data captured by the image capturing unit 102, an image display memory for a display unit 106, the work area of the control unit 101, and the like.

An operation unit 105 is used to accept instructions to the digital camera 100 from the user. The operation unit 105 includes, for example, operation members such as a power button used by the user to instruct ON/OFF of the power supply of the digital camera 100, a release switch used to instruct shooting, and a playback button used to instruct playback of image data. A touch panel provided on the display unit 106 to be described later is also included in the operation unit 105. Note that the release switch includes SW1 and SW2. When the release switch is set in a so-called half stroke state, SW1 is turned on. When SW1 is turned on, the control unit 101 performs preparation for shooting such as AF (Auto Focus) processing, AE (Auto Exposure) processing, AWB (Auto White Balance) processing, and EF (Electronic Flash) processing. When the release switch is set in a so-called full stroke state, SW2 is turned on. The control unit 101 accepts the ON of SW2 as an instruction to do shooting.

The display unit 106 displays a viewfinder image at the time of shooting, shot image data, characters for interactive operations, and the like. Note that the digital camera 100 need not always include the display unit 106. For example, the digital camera 100 need only be connectable to the display unit 106 and have a display control function of controlling display on the display unit 106.

A simple connection button 107 is an interface used to easily perform connection between the digital camera 100 and an external apparatus. When an external device to be connected is set on the digital camera 100 in advance, the designated external apparatus can immediately be connected after selection of the simple connection button 107.

The recording medium 110 can record image data output from the image capturing unit 102. The recording medium 110 may be configured to be detachable from the digital camera 100 or incorporated in the digital camera 100. That is, the digital camera 100 need only have an arrangement to access at least the recording medium 110.

A connection unit 111 is an interface used to connect an external apparatus. The digital camera 100 according to this embodiment can transmit/receive data to/from an external apparatus via the connection unit 111. Note that in this embodiment, the connection unit 111 is a wireless communication unit including an antenna, and the control unit 101 can be connected to an external apparatus via the antenna. The digital camera 100 has been described above.

<Arrangement of Mobile Phone>

A mobile phone 200 that is an example of an external apparatus will be described next. FIG. 2 is a block diagram showing an example of the arrangement of the mobile phone 200 as an example of the external apparatus that receives a content from a content transmission apparatus according to this embodiment. Note that although the mobile phone will be explained here as an example of the external apparatus, the external apparatus is not limited to this. For example, various kinds of information processing apparatuses such as a digital camera having a wireless function, a tablet device, and a personal computer can be applied to the external apparatus for receiving content.

A control unit 201 controls the units of the mobile phone 200 in accordance with input signals and programs to be described later. Note that instead of causing the control unit 201 to control the entire apparatus, a plurality of pieces of hardware may share the processing to control the entire apparatus. An image capturing unit 202 converts object light formed into an image via a lens included in the image capturing unit 202 into an electrical signal, performs noise reduction processing and the like, and outputs digital data as image data. The captured image data is stored in a buffer memory, undergoes predetermined arithmetic processing by the control unit 201, and is recorded in a recording medium 210.

A nonvolatile memory 203 is an electrically erasable/recordable nonvolatile memory, and stores, for example, programs (to be described later) which are executed by the control unit 201. A work memory 204 is used as an image display memory for a display unit 206, the work area of the control unit 201, and the like. An operation unit 205 is used to accept instructions to the mobile phone 200 from the user. The operation unit 205 includes, for example, operation members such as a power button used by the user to instruct ON/OFF of the power supply of the mobile phone 200 and a touch panel provided on the display unit 206. The display unit 206 displays image data, characters for interactive operations, and the like. Note that the mobile phone 200 need not always include the display unit 206. For example, the mobile phone 200 need only be connectable to the display unit 206 and have a display control function of controlling display on the display unit 206.

The recording medium 210 can record image data output from the image capturing unit 202. The recording medium 210 may be configured to be detachable from the mobile phone 200 or incorporated in the mobile phone 200. That is, the mobile phone 200 need only have at least an arrangement to access the recording medium 210. A connection unit 211 is an interface used to connect an external apparatus. The mobile phone 200 according to this embodiment can transmit/receive data to/from the digital camera 100 via the connection unit 211. Note that in this embodiment, the connection unit 211 is an antenna, and the control unit 201 can be connected to the digital camera 100 via the antenna.

A public network connection unit 212 is an interface used to perform public wireless communication. The mobile phone 200 can perform speech communication with another device via the public network connection unit 212. At this time, the control unit 201 inputs and outputs voice signals via a microphone 213 and a speaker 214, thereby implementing the speech communication. In this embodiment, the public network connection unit 212 includes an antenna, and the control unit 201 can be connected to the public network via the antenna. Note that the connection unit 211 and the public network connection unit 212 may share one antenna. The mobile phone 200 has been described above.

<Outline of Connection Forms>

Figure 3A:
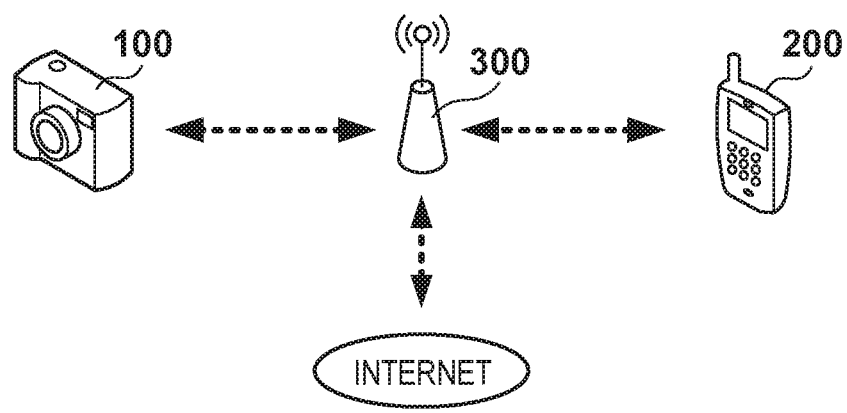
FIGS. 3A and 3B are views showing an example of a network configuration according to the embodiment.
Figure 3B:
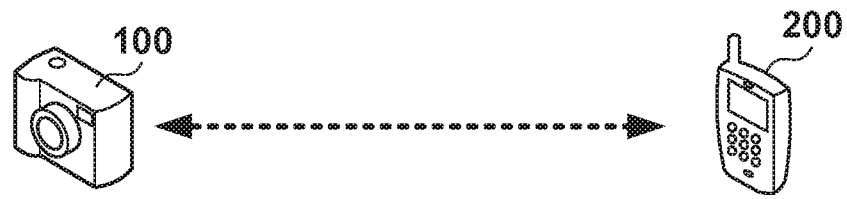

FIGS. 3A and 3B are views schematically showing connection forms between the digital camera 100 and the mobile phone 200 according to this embodiment. When the digital camera 100 and the mobile phone 200 wirelessly transmit/receive data, two connection forms shown in FIGS. 3A and 3B are considerable.

FIG. 3A illustrates a form in which the digital camera 100 and the mobile phone 200 join a wireless LAN formed by an external AP 300 as an example of an external relay apparatus. The digital camera 100 and the mobile phone 200 detect a beacon signal periodically transmitted by the external AP 300, and join the wireless LAN formed by the external AP 300. The digital camera 100 and the mobile phone 200 join the same wireless LAN and then become capable of transmitting/receiving data by the wireless LAN (establish communication between the devices) after, for example, finding each other and acquiring device capabilities. The external AP 300 according to this embodiment can be connected to an external network such as the Internet using a public network or the like. Hence, the mobile phone 200 can transmit data to the Internet via the external AP 300.

FIG. 3B illustrates a form in which the digital camera 100 and the mobile phone 200 are directly connected without intervening with the external AP 300. In this case, the digital camera 100 operates as a simple AP and forms a wireless LAN. When operating as the simple AP, the digital camera 100 starts periodically transmitting a beacon signal. The mobile phone 200 detects the beacon signal and joins the wireless LAN formed by the digital camera 100. As in FIG. 3A, the digital camera 100 and the mobile phone 200 become capable of transmitting/receiving data after, for example, finding each other and acquiring device capabilities.

Note that although in the above-described example, the digital camera 100 always operates as a simple AP in direct connection, as shown in FIG. 3B, the present invention is not limited to this. For example, the digital camera 100 and the mobile phone 200 may communicate in advance, and which one of them should serve as a simple AP may dynamically be decided. As described above, the digital camera 100 and the mobile phone 200 have two kinds of connection forms.

<Outline of Connection Processing>

Processing when connecting the digital camera 100 and the mobile phone 200 according to this embodiment will be described next. As described above, the digital camera 100 according to this embodiment can be connected to the mobile phone 200 via the connection unit 111. It is possible to select image data recorded in the recording medium 110 of the digital camera 100 and transmit it to the mobile phone 200 via the connection.

In this embodiment, connection of the digital camera 100 and the mobile phone 200 can be done using one of a first connection mode in which an external apparatus is connected by performing predetermined operations and a second connection mode in which an external apparatus registered in advance is connected by performing a smaller number of operations than in the first connection mode. In this embodiment, there exist two connection modes: a normal connection mode as the first connection mode and a simple connection mode as the second connection mode. The normal connection mode is a connection mode used to connect a mobile phone connectable to the digital camera 100. The user operates the operation unit 105 of the digital camera 100 to display a menu concerning the wireless LAN on the display unit 106, and connects the mobile phone 200. On the other hand, the simple connection mode is a connection mode used to register one mobile phone to be connected frequently and connect it in a shorter step as compared to the normal connection mode. In the simple connection mode, the digital camera 100 and the mobile phone 200 can be connected only by pressing the simple connection button 107 when viewed from the user. Note that although an arrangement for registering one mobile phone in the simple connection mode will be described in this embodiment, the present invention is not limited to this. For example, a plurality of simple connection buttons may be provided to register mobile phones corresponding to them, and each mobile phone may be connected in the simple connection mode.

In this embodiment, when transmitting image data from the digital camera 100 to the mobile phone 200 in the normal connection mode, two methods are usable. In one method, the transmission processing is controlled by operating the digital camera 100. In the other method, the transmission processing is controlled by operating the mobile phone 200. In the first operation mode in which the transmission processing is controlled by operating the digital camera 100, the following procedure is performed. First, image data recorded in the recording medium 110 of the digital camera 100 are displayed on the display unit 106 of the digital camera 100. The user browses the displayed image data, selects, via the operation unit 105, image data to be transmitted, and instructs transmission. With these operations, the selected image data is transmitted from the digital camera 100 to the mobile phone 200.

On the other hand, in the second operation mode in which the transmission processing is controlled by operating the mobile phone 200, first, the mobile phone 200 acquires image data (thumbnails) recorded in the recording medium 110 from the digital camera 100 and displays them on the display unit 206 of the mobile phone 200. The user browses the displayed image data, selects, via the operation unit 205, image data to be transmitted from the digital camera 100, and sends a transmission request to the digital camera 100. Upon receiving the request, the digital camera 100 transmits the requested image data to the mobile phone 200. Note that if the content is audio data or document data, metadata such as a title of music or a file name is acquired and displayed.

To implement image data transmission processing by the above-described first and second operation modes, each of the digital camera 100 and the mobile phone 200 according to this embodiment has two modes. These modes will be explained below.

One of the operation modes of the digital camera 100 is a camera operation mode. In the camera operation mode, the user can control transmission processing by operating the digital camera 100. In the camera operation mode, the digital camera 100 selectably displays, on the display unit 106, image data recorded in the recording medium 110. The user can select a displayed image via the operation unit 105. The user can input, via the operation unit 105, an instruction to transmit the selected image data to the mobile phone 200. The operation mode of the mobile phone 200 corresponding to the camera operation mode of the digital camera 100 is an external apparatus standby mode. In the external apparatus standby mode, the mobile phone 200 can receive an image transmitted from the digital camera 100. In this mode, it is impossible to control image data transmission processing from the digital camera 100 via the operation unit 205 of the mobile phone 200 (for example, select, via the operation unit 205, an image to be transmitted from the digital camera 100).

The other operation mode of the digital camera 100 is a camera standby mode. In the camera standby mode, the user cannot control image data transmission processing to the mobile phone 200 via the operation unit 105 of the digital camera 100. When the digital camera 100 is set in this mode, transmission processing is controlled by operating the mobile phone 200. The operation mode in which the mobile phone 200 controls transmission processing in correspondence with the camera standby mode is called an external apparatus operation mode. In the external apparatus operation mode, the mobile phone 200 receives the thumbnails of image data recorded in the recording medium 110 from the digital camera 100 and selectably displays them on the display unit 206. The user can thus select an image to be transmitted while browsing the images in the digital camera 100 using the mobile phone 200. The mobile phone 200 transmits, to the digital camera 100, a transmission request to cause it to transmit the selected image. Note that the digital camera 100 in the camera standby mode transmits the image to the mobile phone 200 in response to the transmission request from the mobile phone 200 in the external apparatus operation mode.

As described above, the camera operation mode and the external apparatus standby mode correspond to the first operation mode of the digital camera 100 and the mobile phone 200, and the camera standby mode and the external apparatus operation mode correspond to the second operation mode. That is, in the first operation mode in which transmission processing is controlled by operating the digital camera 100, the transmission processing cannot be operated from the mobile phone 200. To the contrary, in the second operation mode in which transmission processing is controlled by operating the mobile phone 200, the transmission processing cannot be operated from the digital camera 100.

These operation modes can be switched while maintaining the correspondence relationship between them. For example, when the mobile phone 200 is switched from the external apparatus standby mode to the external apparatus operation mode, the digital camera 100 is switched from the camera operation mode to the camera standby mode. In this embodiment, however, the digital camera 100 is activated in the camera operation mode first, and the mobile phone 200 is activated in the external apparatus standby mode. To switch the mobile phone 200 to the external apparatus operation mode, a permission from the digital camera 100 is necessary. This is because, for example, when connecting the user's digital camera 100 to the mobile phone 200 of another person, the user may want to avoid opening the image data to the other person. In this embodiment, the user can select, by a user operation on the digital camera 100, whether to permit opening of the image data when connecting the mobile phone 200 or by selecting a predetermined setting menu. Whether the mobile phone 200 can transit to the external apparatus operation mode is decided based on selection of the opening permission. Note that not only the presence/absence of opening but also the condition under which the image data are opened may be set concerning the opening. For example, image data selected in advance, image data including a specific object, image data recorded in a specific recording format, or image data given a specific rating (favorite level) may be set.

Note that the digital camera can be configured to record the result of selecting whether to open image data in the nonvolatile memory 103 of the digital camera 100 and automatically decide whether to open image data from the next connection. This makes it possible to decide whether to permit opening of image data without the necessity of a user operation from connection of second time. Alternatively, the ID of each communication partner and permission/prohibition of opening of image data may be recorded in the nonvolatile memory 103 in association with each other, and whether to permit opening of image data may be decided in accordance with the connected mobile phone (to be described later as a connection history). At this time, when connecting a mobile phone, it may be judged whether the ID is registered, and if the ID is not registered, the user may be caused to select whether to permit opening of image data.

When image data in the digital camera 100 is transmitted to the mobile phone 200 in the simple connection mode, image transmission can be controlled by operating the mobile phone 200. In this case, the digital camera 100 is set in the camera standby mode, and the mobile phone 200 is set in the external apparatus operation mode or the external apparatus standby mode. However, the digital camera 100 cannot transit to the camera operation mode. This is because the simple connection mode is a mode to connect the digital camera 100 to a specific connection partner such as the user's mobile phone 200. Since only connection to a specific connection partner is possible, opening of image data may always be permitted without asking the user whether to permit opening of image data in connection by the simple connection mode.

<Connection Processing>

Figure 4B:
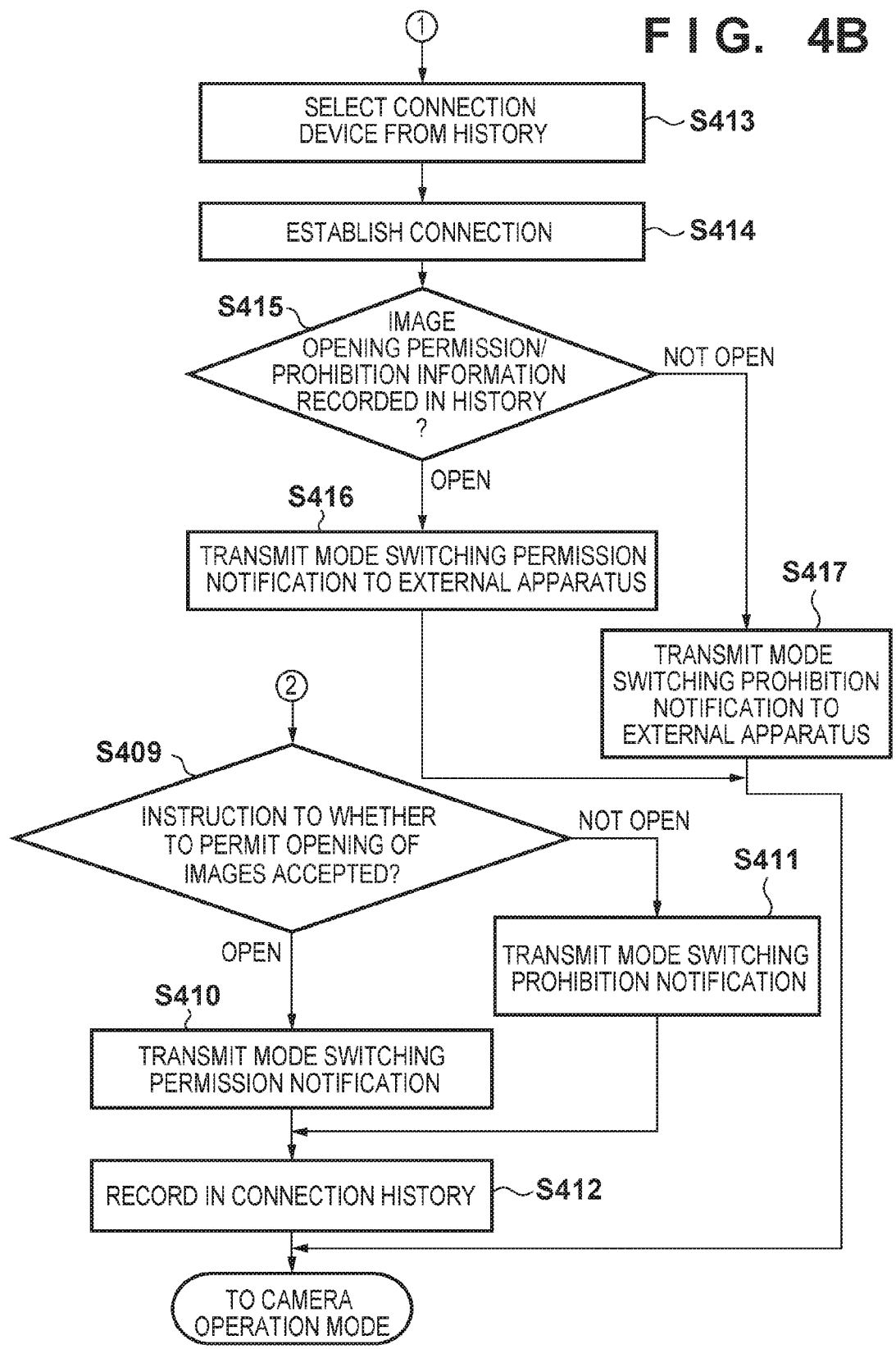
Figure 5A:
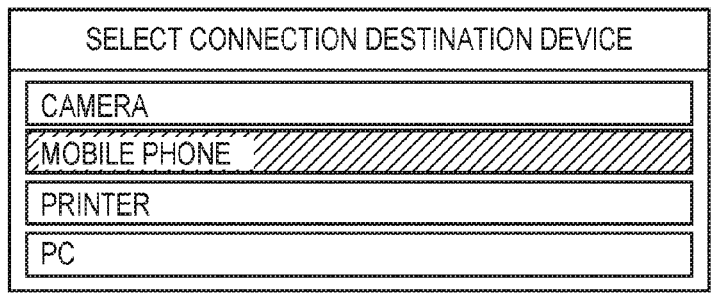
FIGS. 5A to 5H are views showing examples of the display screen of the digital camera in connection processing.

FIGS. 4A and 4B are flowcharts showing the operation of the digital camera 100 when the digital camera 100 and the mobile phone 200 establish connection in the normal connection mode. Each process of the flowchart is implemented by causing the control unit 101 of the digital camera 100 to execute a program recorded in the nonvolatile memory 103 and control the units of the digital camera 100 in accordance with the program. This also applies to the following flowcharts illustrating processing executed by the digital camera 100. The processing of the flowchart starts when "mobile phone" is selected on a screen to select the type of the connection destination device as shown in FIG. 5A.

Figure 5B:
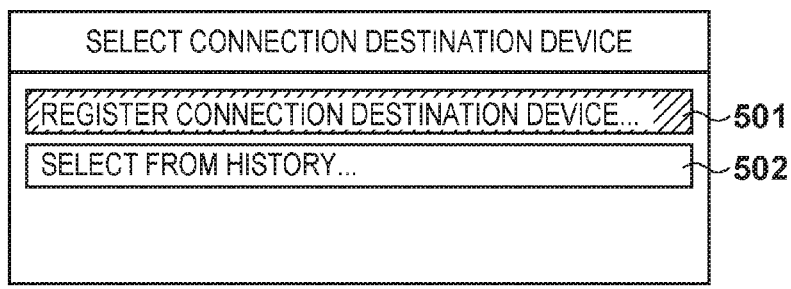

In step S401, the control unit 101 accepts an instruction to select whether to search for a device to be newly connected or connect a device that has already been connected once. In the processing of this step, the control unit 101 displays, for example, a screen as shown in FIG. 5B on the display unit 106. This screen displays a "newly connect" button 501 used to accept an instruction to search for a device to be newly connected and a "select from history" button 502 used to accept an instruction to connect a device that has already been connected once. The user can input the instruction to search for a device to be newly connected by selecting the "newly connect" button 501 via the operation unit 105. Alternatively, the user can input the instruction to connect a device that has already been connected once by selecting the "select from history" button 502 via the operation unit 105.

A case in which the control unit 101 determines in step S401 that the instruction to search for a device to be newly connected is accepted will be described below. In this case, the process advances to step S402. In step S402, the control unit 101 displays a screen shown in FIG. 5C on the display unit 106. This screen displays two buttons. One is a "use camera as access point" button 511 used to make the digital camera 100 serve as an access point and allow the mobile phone 200 to directly connect the digital camera 100. The other is a "search for access point" button 512 used to search for a network generated by an access point in the neighborhood and connect the network, thereby allowing the mobile phone 200 as well to connect the digital camera 100 via the access point.

Figure 5C:
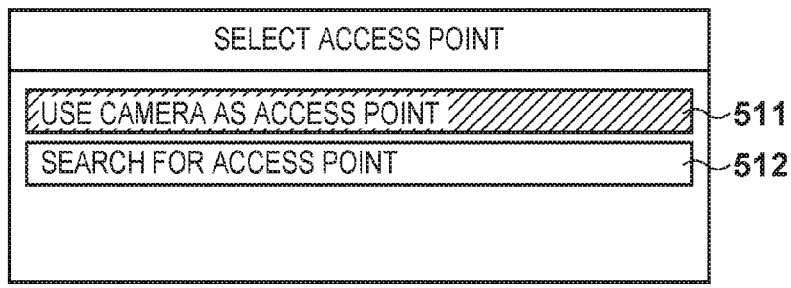
Figure 5D:

When the "use camera as access point" button 511 is selected (when network generation is selected) on the screen of FIG. 5C, the process advances to step S403. In step S403, the control unit 101 of the digital camera 100 activates an access point function and generates a network. At this time, the display unit 106 displays a screen as shown in FIG. 5D, and the digital camera waits for connection from the mobile phone 200.

Figure 5E:
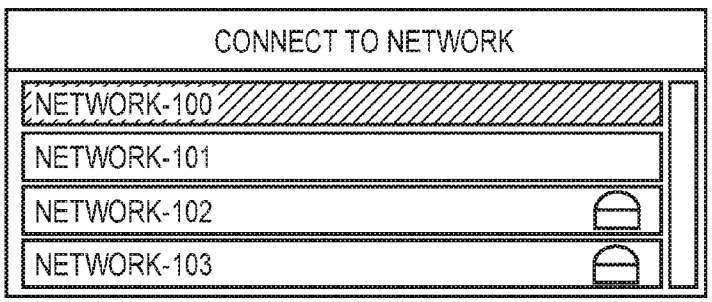

When the "search for access point" button 512 is selected in step S402, the process advances to step S404. In step S404, the control unit 101 detects networks generated by access points in the neighborhood of the digital camera 100 and lists the networks. In addition, the control unit 101 accepts an instruction to join one of the detected networks. For example, the control unit 101 displays a screen as shown in FIG. 5E on the display unit 106. Four networks "NETWORK-100", "NETWORK-101", "NETWORK-102", and "NETWORK-103" are listed on the screen as the ESSIDs of the detected networks. The user can select the ESSIDs via the operation unit 105. When an ESSID is selected, the control unit 101 accepts an instruction to join a network corresponding to the selected ESSID.

In step S405, the control unit 101 accepts information necessary to join the selected network. For example, the control unit 101 accepts input of an encryption key, an IP address acquisition method, DNS server setting, and the like. The user can input these pieces of information via the operation unit 105. In step S406, the control unit 101 joins the network using the information whose input is accepted in step S405.

Figure 5F:
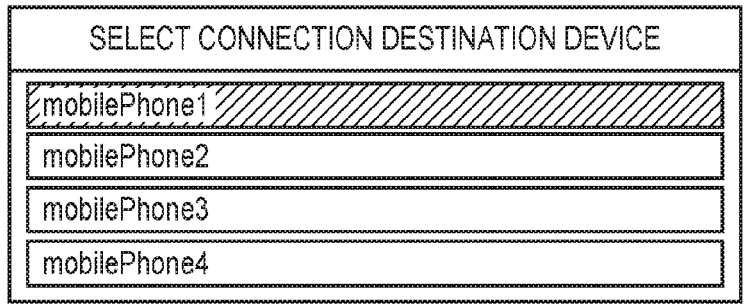

In step S407, the control unit 101 detects other devices joining in the network, lists the detected devices, and accepts an instruction to select a device to be connected. More specifically, the digital camera 100 transmits information for the search, and receives information returned as a response from another device that has received the transmitted information, thereby detecting the other device joining the network. The information returned from the other device as a response includes information representing the name, type, and the like of the device. The control unit 101 refers to the device name included in the information and displays, for example, a screen as shown in FIG. 5F on the display unit 106. At this time, devices that can be a content transmission target are preferably selectively displayed. The names (mobilePhone 1 to 4) of detected devices are listed on the screen of FIG. 5F. In this embodiment, the control unit 101 filters the device types included in the responses from the other devices, thereby displaying only mobile phones. Hence, in this example, the names of devices of types other than mobile phone are not displayed even if they are joining the network. The user can select an arbitrary one of the listed device names via the operation unit 105. When the name is selected, the control unit 101 accepts an instruction to connect the device of the selected name.

Upon accepting the instruction to connect the device of the name selected in step S407, the control unit 101 connects the device of the selected name in step S408. For example, when a name corresponding to the mobile phone 200 is selected, the control unit 101 transmits a connection request to the mobile phone 200 via the connection unit 111. When a connection acceptance signal transmitted from the mobile phone 200 in response to the connection request is received, communication with the mobile phone 200 as an external apparatus is established.

Figure 5G:
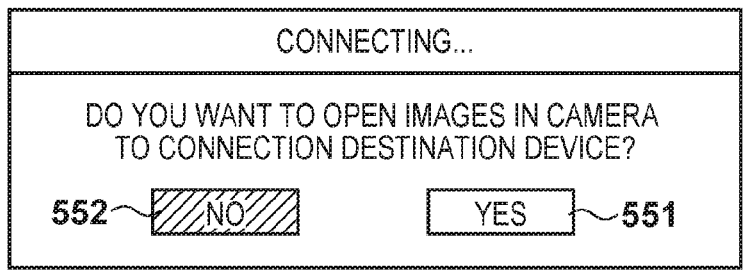

In step S409, the control unit 101 accepts an instruction to select whether to permit opening of image data recorded in the recording medium 110. More specifically, the control unit 101 displays a screen as shown in FIG. 5G on the display unit 106. In the example of FIG. 5G, a message "do you want to open images in camera to connection destination device?" is displayed to prompt the user to input the instruction to select whether to open image data. In addition, the user selects, via the operation unit 105, a "yes" button 551 or a "no" button 552 displayed on the screen, thereby inputting the instruction.

Upon determining that the "yes" button 551 is selected, the control unit 101 determines that an instruction to open image data is accepted. In this case, the user is permitted to browse the image data recorded in the recording medium 110 of the digital camera 100 from the mobile phone 200. In other words, the mobile phone 200 is permitted to transit to the external apparatus operation mode. The user of the mobile phone 200 can thus input, via the operation unit 205, a transmission request of an image to be acquired from the digital camera 100 while browsing the image data recorded in the recording medium 110 of the digital camera 100.

Upon determining that the "no" button 552 is selected, the control unit 101 determines that an instruction not to open image data is accepted. In this case, the user is prohibited from browsing the image data recorded in the recording medium 110 of the digital camera 100 from the mobile phone 200. In other words, the mobile phone 200 is prohibited from transiting to the external apparatus operation mode.

When the control unit 101 determines in step S409 that the instruction to open image data is accepted, the process advances to step S410. In step S410, the control unit 101 transmits a mode switching permission notification to the external apparatus. Upon receiving the notification, the external apparatus (in this example, the mobile phone 200) can accept an instruction to make transition from the external apparatus standby mode to the external apparatus operation mode. That is, the mobile phone 200 can transit to the external apparatus operation mode by the operation from the mobile phone 200. In other words, image data to be transmitted to the mobile phone 200 can be selected from the image data recorded in the recording medium 110 of the digital camera 100 by the operation on the side of the mobile phone 200. Processing of the mobile phone 200 will be described later. With the processing of step S410, the digital camera 100 can accept an image transmission instruction from the mobile phone 200. The process then advances to step S412.

When the control unit 101 determines in step S409 that the instruction not to open image data is accepted, the process advances to step S411. In step S411, the control unit 101 transmits a mode switching prohibition notification to the external apparatus. Upon receiving the notification, the external apparatus (in this example, the mobile phone 200) cannot accept an instruction to make transition from the external apparatus standby mode to the external apparatus operation mode. That is, the mobile phone 200 cannot transit to the external apparatus operation mode only by the operation from the mobile phone 200. In other words, image data to be transmitted to the mobile phone 200 cannot be selected from the image data recorded in the recording medium 110 of the digital camera 100 by the operation on the side of the mobile phone 200. Processing of the mobile phone 200 will be described later. With the processing of step S411, the digital camera 100 can be prohibited from accepting an image transmission instruction from the mobile phone 200. The process then advances to step S412.

In step S412, the control unit 101 records the information representing whether to open image data in a connection history together with information representing that the mode is the normal connection mode based on the instruction accepted in step S409. The connection history will be described here in detail.

The connection history is a database that holds information used when connecting an external apparatus for each external apparatus, and is recorded in the nonvolatile memory 103. In this embodiment, when reconnecting an external apparatus that has been connected once, the control unit 101 refers to the connection history, thereby connecting the external apparatus without causing the user to input information necessary for connection again (step S413). The connection history includes a connection history number, ESSID, BSSID, authentication method, encryption type, encryption key, channel, IP address acquisition method, DNS acquisition method, connection device type, connection device name, device type, UUID, browsing permission information, and connection mode information as information used when connecting an external apparatus. For example, if the control unit 101 determines in step S409 that an instruction not to open image data is accepted, information representing "prohibited" is recorded in the connection history as browsing permission information. The browsing permission information recorded here is used when reconnecting the external apparatus. This will be described later. When the processing of this step ends, the mode transits to the camera operation mode. The case in which the control unit 101 determines in step S401 that the instruction to search for a device to be newly connected is accepted has been described above.

A case in which the control unit 101 determines in step S401 that the instruction to connect a device that has already been connected (instruction to do selection from the history (FIG. 5B)) is accepted will be described next. In this case, the process advances to step S413.

Figure 5H:
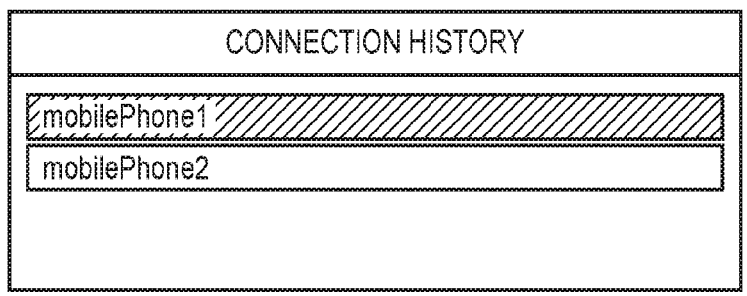

In step S413, the control unit 101 accepts a user instruction to select a device to be connected out of devices that have already been connected. More specifically, the control unit 101 refers to the connection history and displays a screen as shown in FIG. 5H on the display unit 106. This screen displays the names of external apparatuses connected in the past included in the connection history. In this case, the control unit 101 refers to "connection device type" out of the above-described information of the connection history, and filters targets whose names are to be displayed on the display unit 106 from the information of the connection history. In this embodiment, "mobile phone" is selected as "connection device type". For this reason, only devices for which "connection device type" is "mobile phone" are displayed out of the connection history.

In step S414, the control unit 101 establishes connection to the selected external apparatus based on the user instruction accepted in step S413 and the information included in the connection history. In this case, the control unit 101 automatically joins the network using information necessary to join the network, such as an ESSID included in the connection history, and also automatically searches for the selected device from the same network based on the UUID and connects it. This can save the user from inputting information necessary for connection such as the ESSID and network selection.

When the connection is established in step S414, in step S415, the control unit 101 refers to the browsing permission information included in the connection history of the selected external apparatus (mobile phone) and determines whether the selected external apparatus was permitted to browse image data in the past. If the control unit 101 determines that the selected external apparatus was permitted to browse image data in the past, the process advances to step S416. In step S416, the same process as in step S410 is executed. If the control unit 101 determines that the selected external apparatus was not permitted to browse image data in the past, the process advances to step S417. In step S417, the same process as in step S411 is executed. In this way, when reconnecting an external apparatus that has been connected once, automatic selection is done without the necessity of selection. It is therefore possible to save the user from inputting a browsing permission at the time of reconnection. Then, the processing of the flowchart ends, and the digital camera transits to the camera operation mode.

Note that a user interface or a screen to edit the browsing permission information registered in the connection history (for example, to make "permitted/prohibited" of the browsing permission information changeable for each external apparatus) may be provided, as a matter of course. The operation of the digital camera 100 when connecting the digital camera 100 and the mobile phone 200 has been described above.

FIG. 6 is a flowchart showing the operation of the digital camera 100 when the digital camera 100 and the mobile phone 200 establish connection in the simple connection mode. The processing of the flowchart starts when the simple connection button 107 of the digital camera 100 is pressed.

First, in step S601, the control unit 101 refers connection history information and confirms whether there exists history information in which the connection mode information indicates the simple connection mode. If there exists no history information in which the connection mode information indicates the simple connection mode, the process advances to step S602 to perform new registration. If there exists history information in which the connection mode information indicates the simple connection mode, the process advances to step S611, and the control unit 101 starts connection to the device in the history information.

A case in which there exists no history information in which the connection mode information indicates the simple connection mode in step S601 will be described first. In this case, the process advances to step S602. In steps S602 to S608, the control unit 101 does network settings and establishes connection to the external device by the same processes as in steps S402 to S408 of FIG. 4A.

In step S609, the control unit 101 transmits a simple connection mode notification to the mobile phone 200. Upon receiving the notification, the mobile phone 200 can select image data to be transmitted to the mobile phone 200 out of image data recorded in the recording medium 110 of the digital camera 100 by the operation on the side of the mobile phone 200. In the simple connection mode, the mobile phone 200 is prohibited from transiting to the external apparatus standby mode in which image data is transmitted to the mobile phone 200 by the operation on the side of the digital camera 100. Processing of the mobile phone 200 will be described later. The process then advances to step S610.

In step S610, the control unit 101 records connection information including information indicating the simple connection mode in the connection history. The case in which there exists no history information in which the connection mode information indicates the simple connection mode in step S601 has been described above. A case in which there exists history information in which the connection mode information indicates the simple connection mode in step S601 will be described next. In this case, the process advances to step S611.

In step S611, the control unit 101 establishes connection based on the information included in the connection history. In this case, the control unit 101 automatically joins the network or generates a network using information necessary to join the network/generate a network, such as an ESSID included in the connection history. The control unit 101 also automatically searches for the selected connection device from the same network based on the UUID and connects it. This can save the user from inputting information necessary for connection such as the ESSID and network selection.

When the connection is established in step S611, in step S612, the control unit 101 transmits a simple connection mode notification to the mobile phone 200, as in step S609. Note that in this embodiment, the mobile phone is notified that the mode is the simple connection mode in step S609 or S612. However, if the mobile phone 200 does not change the operation, the notification need not always be transmitted. The operation of the digital camera 100 when the digital camera 100 and the mobile phone 200 are connected in the simple connection mode has been described above.

Figure 7A:
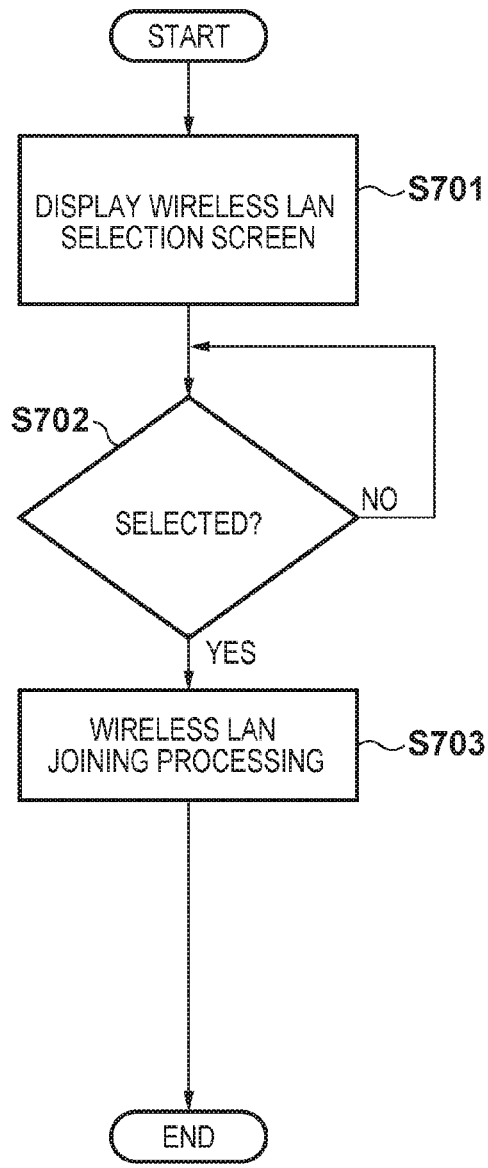
FIGS. 7A and 7B are flowcharts showing connection processing of the mobile phone.
Figure 7B:
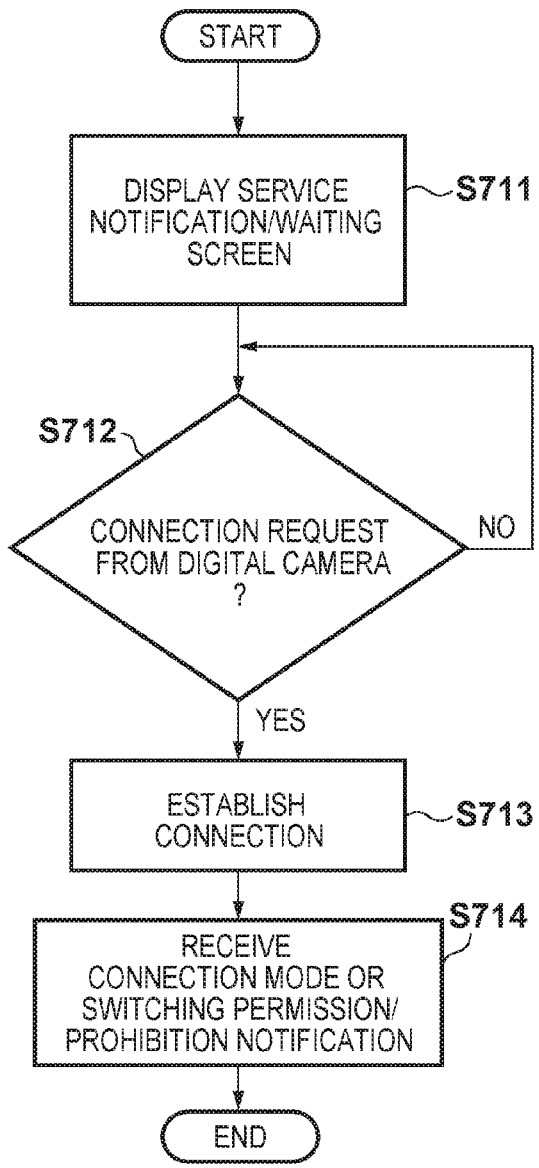

FIGS. 7A and 7B are flowcharts showing processing of the mobile phone 200 according to this embodiment. Note that the processes of the flowcharts are implemented by causing the control unit 201 of the mobile phone 200 to control the units of the mobile phone 200 in accordance with input signals and programs. Note that this also applies to the other following flowcharts illustrating processing of the mobile phone 200 unless specifically stated otherwise.

Figure 5I:
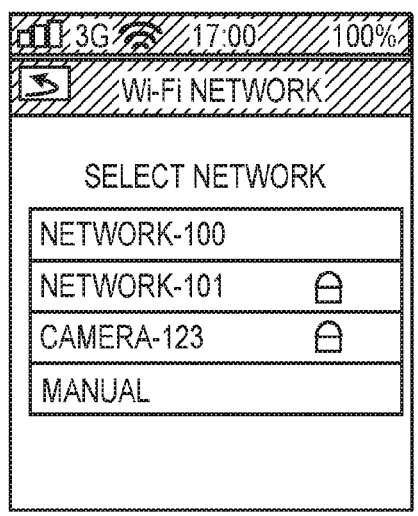
FIGS. 5I and 5J are views showing examples of the display screen of the mobile phone in connection processing.

First, in accordance with a predetermined operation performed by the user of the mobile phone 200, in step S701, the control unit 201 causes the display unit 206 to display a screen to select a wireless LAN to join. When transiting to this screen, the control unit 201 scans wireless LANs in the neighborhood and displays a list of ESSIDs detected consequently. FIG. 5I shows an example of the screen. In this embodiment, these processes are performed by the function of the OS of the mobile phone 200 before activation of the camera communication application. Instead, the camera communication application activated in advance may perform the processes in cooperation with the function of the OS. When the digital camera 100 operates as a simple AP, the mobile phone 200 detects the ESSID of the digital camera 100 and displays it in the list. In FIG. 5I, "CAMERA-123" is displayed as the ESSID of the digital camera 100.

In step S702, the control unit 201 waits for one of the ESSIDs in the list to be selected. When one of the ESSIDs in the list is selected by a user operation, the control unit 201 performs joining processing for a corresponding wireless LAN in step S703. Joining the network is thus completed.

After joining the network, the user of the mobile phone 200 activates the camera communication application installed in the mobile phone 200. Processing of the mobile phone 200 after activation of the camera communication application will be described with reference to the flowchart of FIG. 7B. Main functions of the camera communication application are a function of establishing communication with a digital camera in the same network, a function of transmitting/receiving content data such as image data, and a function of controlling processing of transmitting content data held by the local device to a server.

Figure 5J:
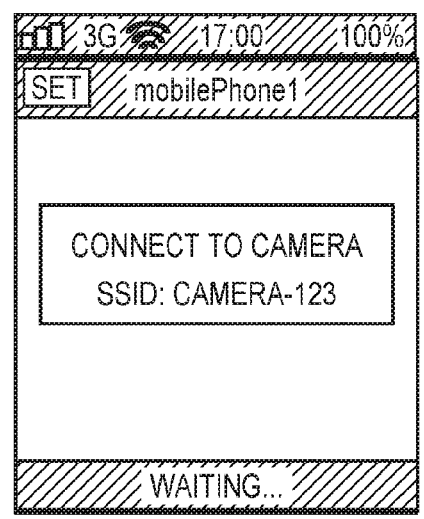

When the camera communication application is activated based on a user operation, a waiting screen as shown in FIG. 5J is displayed on the display unit 206 in step S711. The SSID of the network that the mobile phone is currently joining is displayed in the dialogue. FIG. 5J shows an example of the screen displayed in step S711 when "CAMERA-123" is selected on the screen of FIG. 5I. After activation of the camera communication application, the control unit 201 notifies the digital camera 100 of the service of the local device via the wireless LAN so that the digital camera 100 can detect the mobile phone 200. The digital camera 100 can detect the mobile phone 200 based on the service notification. Note that the service notification includes the device name and UUID of the mobile phone 200.

In step S712, the control unit 201 waits for a connection request from the digital camera 100. Upon determining that a connection request is received, the control unit 201 establishes communication with the digital camera 100 in step S713. In step S714, the control unit 201 receives the mode switching permission/prohibition notification transmitted in the normal connection mode of the digital camera 100 shown in FIGS. 4A and 4B or the simple connection mode notification transmitted in the simple connection mode shown in FIG. 6. The mode switching permission/prohibition notification is transmitted from the digital camera 100 in step S410, S411, S416, or S417. The simple connection mode notification is transmitted in step S609 or S612.

The operation of the mobile phone 200 when connecting the digital camera 100 and the mobile phone 200 has been described above.

<Processing after Connection>

FIG. 8 is a flowchart showing an operation after the digital camera 100 according to this embodiment is connected to the mobile phone 200. The processing of the flowchart starts after the digital camera 100 is connected to the mobile phone 200. Note that the operation of steps S801 to S806 to be described below corresponds to the operation in the camera operation mode.

First, in step S801, the control unit 101 judges whether the current connection mode is the simple connection mode executed by pressing the simple connection button 107. If the current connection mode is the simple connection mode, the digital camera transits to the camera standby mode without transiting to the camera operation mode. The operation in the camera operation mode will be described later.

Figure 9A:
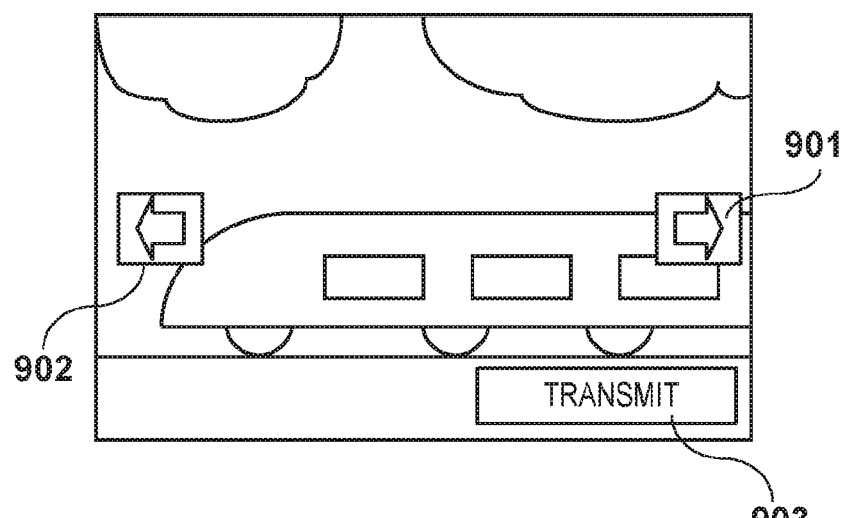
FIGS. 9A to 9C are views showing examples of the display screen of the digital camera after connection according to the embodiment.

In step S802, the control unit 101 displays, on the display unit 106, image data obtained finally out of image data recorded in the recording medium 110, and accepts an instruction from the user. This processing is executed in parallel to step S803. FIG. 9A shows a display example of the image data displayed in step S802. In the example of FIG. 9A, the image data read out from the recording medium 110 is displayed on the screen. An image advance button 901 and an image back button 902 that accept an instruction to display another image data and a transmit button 903 that accepts an instruction to transmit the currently displayed image data to the external apparatus are displayed while being superimposed on the image data. The user selects these buttons via the operation unit 105, thereby inputting an instruction corresponding to each button. Note that if transition to the camera standby mode is possible (when opening of images is permitted), a guidance for transition to the camera standby mode or an operation button for transition to the camera standby mode may be displayed on the screen of FIG. 9A.

In step S803, the control unit 101 determines the instruction accepted in step S802. If the control unit 101 determines in step S803 that an instruction to display another image data is accepted, the process advances to step S804. In step S804, the control unit 101 reads out image data corresponding to the accepted instruction from the recording medium 110, and displays it on the display unit 106. The process then returns to step S803. If the control unit 101 determines in step S803 that an instruction to transmit the image data is accepted, the process advances to step S805. In step S805, the control unit 101 transmits the image data currently displayed on the display unit 106 to the external apparatus. The process then returns to step S803. If the control unit 101 determines in step S803 that no instruction is accepted, the process advances to step S806.

In step S806, the control unit 101 determines whether the mobile phone 200 that is the connected external apparatus has transited from the external apparatus standby mode to the external apparatus operation mode. More specifically, this determination is done by detecting reception of "information representing that the mobile phone 200 makes mode transition". This information is transmitted to the digital camera 100 when the mobile phone 200 makes mode transition. For example, when the mobile phone 200 makes mode transition, the information representing it is transmitted from the mobile phone 200 to the digital camera 100. The digital camera 100 receives and processes the information, thereby knowing that the mobile phone 200 has made mode transition. In accordance with the mode transition of the mobile phone 200, the digital camera 100 can also transit to the corresponding mode (camera standby mode).

If the control unit 101 determines that the mobile phone 200 has not transited to the external apparatus operation mode, the process returns to step S803. If the control unit 101 determines that the mobile phone 200 has transited from the external apparatus standby mode to the external apparatus operation mode, the process advances to step S807. In step S807, the control unit 101 makes the digital camera 100 transit to the camera standby mode in correspondence with the transition of the mobile phone 200 to the external apparatus operation mode. Note that the digital camera 100 according to this embodiment cannot make mode transition by the operation of the digital camera 100 after connection. The operation of the digital camera 100 in the camera operation mode has been described above.

Figure 10:
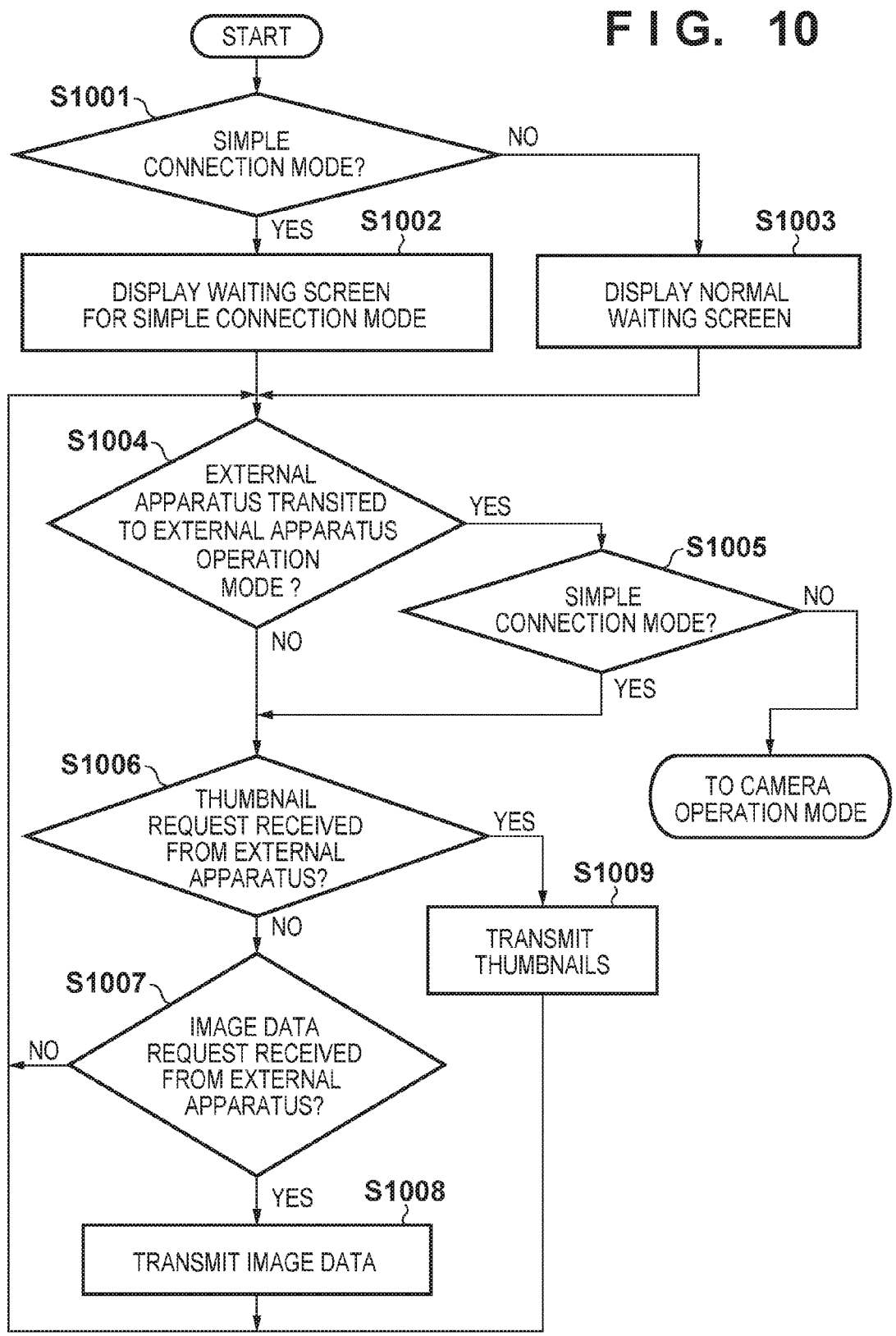
FIG. 10 is a flowchart showing the operation of the digital camera after connection.

The operation of the digital camera 100 in the camera standby mode will be described next. FIG. 10 is a flowchart showing the operation of the digital camera 100 in the camera standby mode. The processing of the flowchart starts in accordance with transition of the digital camera 100 to the camera standby mode.

Figure 9B:

First, in step S1001, the control unit 101 determines whether the connection is done in the simple connection mode. If the connection is not done in the simple connection mode, the control unit 101 displays a waiting screen as shown in FIG. 9B on the display unit 106 in step S1003. In the example of FIG. 9B, a message "operate connection destination device" is displayed on the screen. If the connection is done in the simple connection mode, the control unit 101 displays a screen shown in FIG. 9C different from FIG. 9B on the display unit 106 in step S1002 so that the operator can know that the connection is done not by normal connection but in the simple connection mode. Changing the display in this way allows the operator to discriminate whether the connection is done in the simple connection mode or the normal connection mode. Note that a guidance for transition to the camera operation mode or an operation button for transition to the camera operation mode may be displayed on the screen of FIG. 9B.

In step S1004, the control unit 101 determines whether the mobile phone 200 that is the external apparatus has transited from the external apparatus operation mode to the external apparatus standby mode. Upon determining that the mobile phone 200 has transited from the external apparatus operation mode to the external apparatus standby mode, the control unit 101 judges in step S1005 whether the mode is the simple connection mode. If the mode is not the simple connection mode, the digital camera 100 transits to the camera operation mode. Note that the digital camera 100 according to this embodiment cannot transit to the camera operation mode by the operation of the digital camera 100. Upon determining that the mobile phone 200 has not transited from the external apparatus operation mode to the external apparatus standby mode, or upon judging in step S1005 that the mode is the simple connection mode, the process advances to step S1006.

In step S1006, the control unit 101 determines whether a request of thumbnails included in image data is accepted from the mobile phone 200. Upon determining that a request of thumbnails included in image data is accepted from the mobile phone 200, the process advances to step S1009. In step S1009, the control unit 101 transmits the thumbnails of the image data according to the request to the mobile phone 200. The process then returns to step S1004.

If the control unit 101 determines that a request of thumbnails of image data is not accepted from the mobile phone 200, the process advances to step S1007. In step S1007, the control unit 101 determines whether an image data request is accepted from the mobile phone 200. Upon determining that an image data request is accepted from the mobile phone 200, the process advances to step S1008. In step S1008, the control unit 101 reads out image data according to the request from the recording medium 110 and transmits them to the mobile phone 200. The process then returns to step S1004.

Figure 9C:
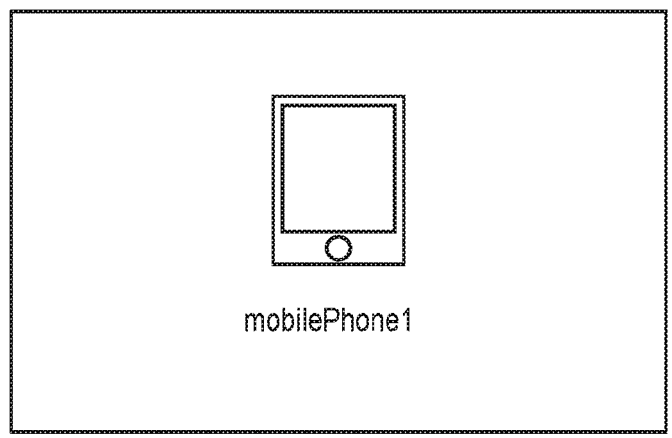

Note that in this embodiment, since the screen display of the digital camera 100 is changed depending on whether the mode is the simple connection mode, as described with reference to FIGS. 9B and 9C, the operator can clearly know to which mode the transition has been made. When connection is done in the simple connection mode, the operator of the digital camera 100 may put the digital camera in a bag without viewing the display unit 106. Assuming such a case, the display of the display unit 106 may be turned off after the elapse of a predetermined time. This can suppress power consumption of the digital camera 100.

Note that in this embodiment, the screen as shown in FIG. 9B is displayed on the display unit 106 at the time of normal connection. However, a method of returning to the camera operation mode by operating the mobile phone 200 may also be displayed. For example, if the camera can be operated to send an image by pressing a back button 1203 in FIG. 12B (to be described later) displayed on the mobile phone 200, a description "you can transmit images by operating the camera by the back button" may be displayed. The operation of the digital camera 100 in the camera standby mode has been described above.

Figure 11:
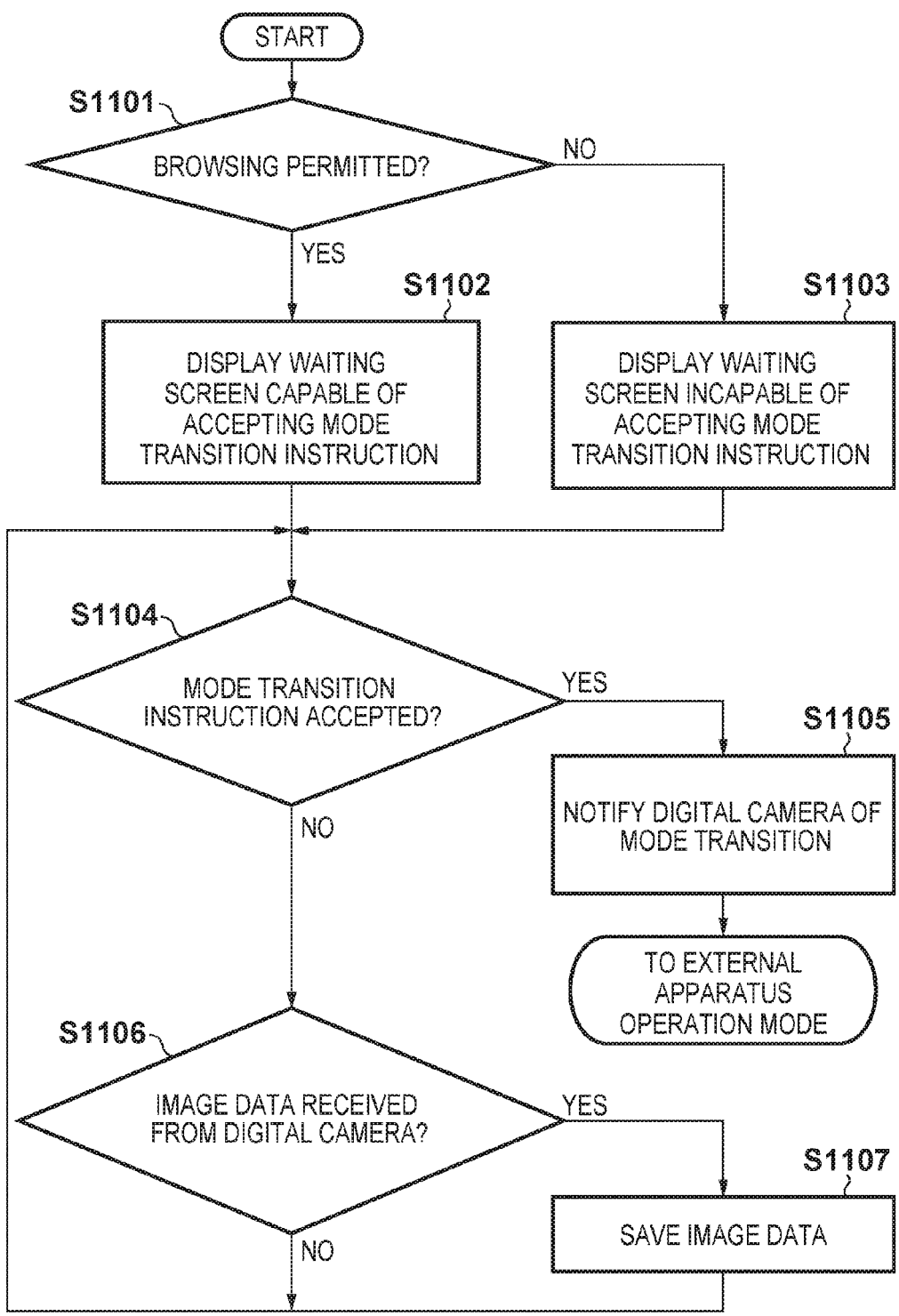
FIG. 11 is a flowchart showing the operation of the mobile phone after connection.

FIG. 11 is a flowchart showing the operation of the mobile phone 200 in the external apparatus standby mode. The processing of the flowchart starts in accordance with transition of the mobile phone 200 to the external apparatus standby mode. Note that when connection to the digital camera 100 is established, the mobile phone 200 according to this embodiment first transits to the external apparatus standby mode and starts communication with the digital camera 100.

First, in step S1101, the control unit 201 determines whether browsing of image data in the digital camera 100 is permitted. More specifically, the control unit 201 determines whether a mode switching permission notification (browsing permitted), a mode switching prohibition notification (browsing prohibited), or a simple connection mode notification is received (browsing permitted) from the digital camera 100 in step S714 of FIG. 7B. As described above, these notifications are transmitted when the digital camera 100 accepts the instruction representing whether to open image data via the operation unit 105 or the simple connection button 107. Hence, upon determining that the mode switching permission notification or simple connection mode notification is received from the digital camera 100, the control unit 201 determines that the digital camera 100 permits opening of image data. In other words, the control unit 201 determines that browsing of image data in the digital camera 100 is permitted. Upon determining that the mode switching prohibition notification is received from the digital camera 100, the control unit 201 determines that the digital camera 100 does not permit opening of image data. In other words, the control unit 201 determines that browsing of image data in the digital camera 100 is not permitted.

Figure 12A:
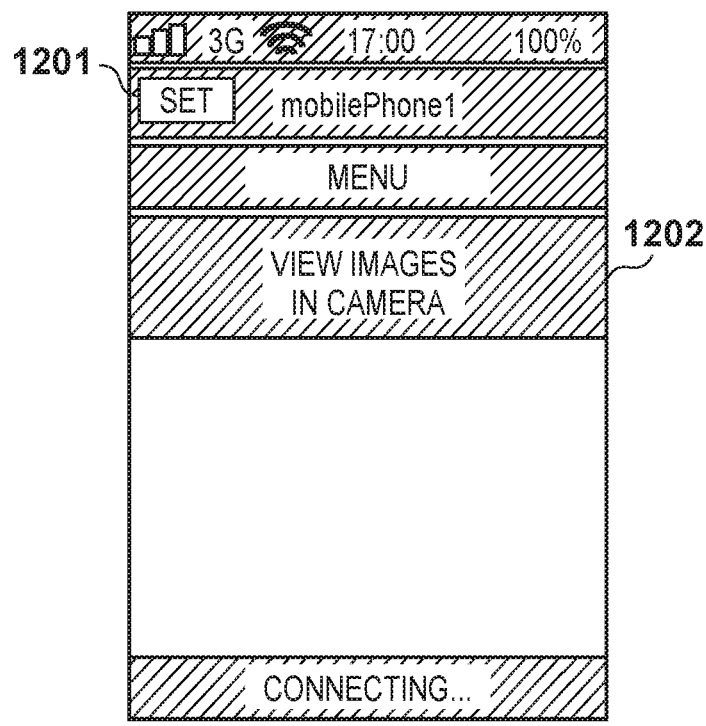
FIGS. 12A and 12B are views showing examples of the display screen of the mobile phone after connection.

If the control unit 201 determines in step S1101 that browsing of image data in the digital camera 100 is permitted, the process advances to step S1102. In step S1102, the control unit 201 displays a screen as shown in FIG. 12A on the display unit 206. In the example of FIG. 12A, the user can change the name of the mobile phone displayed on the digital camera 100 or confirm the version using a setting button 1201. A "view images in camera" button 1202 is displayed on the screen to accept an instruction to make transition from the external apparatus standby mode to the external apparatus operation mode. That is, the control unit 201 displays the screen shown in FIG. 12A, thereby accepting the instruction to make transition from the external apparatus standby mode to the external apparatus operation mode. The user can input the instruction to make the mobile phone 200 transit to the external apparatus operation mode by selecting the button 1202. This allows the user to browse image data recorded in the recording medium 110 of the digital camera 100 from the mobile phone 200.

If the control unit 201 determines in step S1101 that browsing of image data in the digital camera 100 is not permitted, the process advances to step S1103. In step S1103, the control unit 201 displays the same screen (FIG. 12A) as in step S1102 on the display unit 206. However, the "view images in camera" button 1202 used to accept the instruction to make transition from the external apparatus standby mode to the external apparatus operation mode is not displayed. That is, the user cannot input the instruction to make transition to the external apparatus operation mode. The user is thus prohibited from browsing image data recorded in the recording medium 110 of the digital camera 100 from the mobile phone 200. Note that in the external apparatus standby mode, the mobile phone 200 waits for image data transmission from the side of the digital camera 100 on the screen displayed in step S1101 or S1102. Upon receiving the image data, the mobile phone 200 stores the received image data in the recording medium 210. At this time, the received image data may be displayed on the screen shown in FIG. 12A.

In step S1104, the control unit 201 determines whether an instruction to make transition from the external apparatus standby mode to the external apparatus operation mode is accepted. Upon determining that the instruction to make transition to the external apparatus operation mode is accepted, the process advances to step S1105. Note that when the processing of step S1104 is executed after the processing of step S1103, it is always determined that the instruction to make transition is not accepted because the "view images in camera" button 1202 is not displayed on the display unit 206. For example, when the processing of step S1103 is executed, the process may advance to step S1106 without performing the processing of step S1104. That is, in this case, the processing of step S1106 may be executed immediately after step S1103.

In step S1105, the control unit 201 notifies the digital camera 100 of transition from the external apparatus standby mode to the external apparatus operation mode. More specifically, the control unit 201 transmits information representing that the mobile phone 200 makes mode transition to the digital camera 100. As described above, the digital camera 100 detects this in step S806 of FIG. 8 and automatically transits to the camera standby mode in correspondence with the mode transition of the mobile phone 200. When the processing of step S1105 ends, the mobile phone 200 transits to the external apparatus operation mode.

If the control unit 201 determines in step S1104 that the instruction to make transition from the external apparatus standby mode to the external apparatus operation mode is not accepted, the process advances to step S1106. In step S1106, the control unit 201 determines whether image data is received from the digital camera 100. Upon determining that no image data is received from the digital camera 100, the process returns to step S1104.

Upon determining that image data is received from the digital camera 100, the process advances to step S1107. Note that the image data received here is the image data transmitted from the digital camera 100 by the processing of step S806 in FIG. 8. In step S1107, the control unit 201 saves the image data received from the digital camera 100 in the recording medium 210. The process then returns to step S1104. The operation of the mobile phone 200 in the external apparatus standby mode has been described above.

FIG. 13 is a flowchart showing the operation of the mobile phone 200 in the external apparatus operation mode. The processing of the flowchart starts in accordance with transition of the mobile phone 200 to the external apparatus operation mode.

First, in step S1301, the control unit 201 acquires, from the digital camera 100, thumbnails of image data recorded in the recording medium 110 of the digital camera 100. More specifically, when the control unit 201 transmits a request of thumbnails of image data to the digital camera 100, the digital camera 100 reads out thumbnails included in the image data from the recording medium 110 and transmits them to the mobile phone 200 in response to the request. The control unit 201 receives the transmitted thumbnails, and the mobile phone 200 thus acquires the thumbnails. In this embodiment, image data is handled in the Exif format. The control unit 101 of the digital camera 100 reads out the thumbnail recorded in the header field of each image data as a thumbnail corresponding to the image data.

Figure 12B:
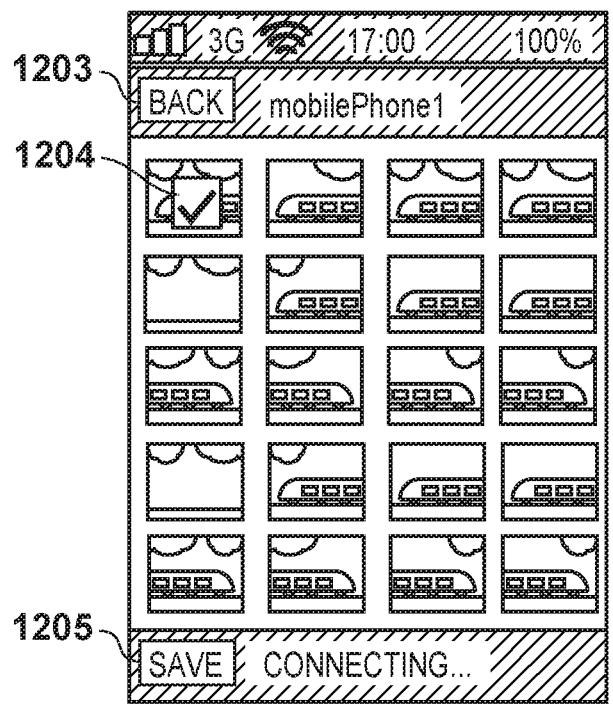

In step S1302, the control unit 201 displays the thumbnails received in step S1301 on the display unit 206 and accepts an instruction from the user. This processing is executed in parallel to the processing of step S1303. FIG. 12B shows an example of a screen displayed in the processing of this step. In the example of FIG. 12B, thumbnails received from the digital camera 100 are displayed. The user of the mobile phone 200 can thus browse the contents of the image data recorded in the recording medium 110 of the digital camera 100 via the display unit 206 of the mobile phone 200.

Referring to FIG. 12B, a check mark 1204 indicates that the thumbnail is in a decided state. The decided state represents that corresponding image data is decided as a target to be saved in the recording medium 210. This example shows that the upper left thumbnail is in the decided state. The user selects an arbitrary one of the plurality of displayed thumbnails via the operation unit 205, thereby inputting an instruction to set the thumbnail in the decided state. For example, the mobile phone can be configured to set a desired thumbnail in the decided state by touching the display position of the thumbnail. Note that the number of thumbnails that can be set in the decided state is not limited to one, and a plurality of thumbnails may be set in the decided state.

The control unit 201 also displays a save button 1205 used to accept an instruction to acquire image data corresponding to the thumbnail in the decided state from the digital camera 100 and save it. The user can transmit a request of image data corresponding to the thumbnail in the decided state to the digital camera 100 by selecting the save button 1205 via the operation unit 205. In addition, the mode switching button 1203 used to accept an instruction to make transition to the external apparatus standby mode is displayed on the screen of FIG. 12B. The user can input the instruction to make the mobile phone 200 to transit to the external apparatus standby mode by selecting the mode switching button 1203.

In step S1303, the control unit 201 determines the instruction accepted in step S1303. If the control unit 201 determines that the "instruction to set a thumbnail in the decided state" is accepted, the process advances to step S1304. In step S1304, the control unit 201 sets the thumbnail for which the instruction is received in the decided state, and displays the check mark 1204. The process then returns to step S1303.

If the control unit 201 determines in step S1303 that the instruction (save button 1205) to save image data corresponding to the thumbnail in the decided state in the recording medium 210 is accepted, the process advances to step S1305. In step S1305, the control unit 201 acquires the image data corresponding to the thumbnail in the decided state from the digital camera 100. More specifically, the control unit 201 transmits an image data transmission request to the digital camera 100 together with information for specifying the image corresponding to the thumbnail in the decided state, and the digital camera 100 transmits the designated image data in response to the request (step S1008). In step S1306, the control unit 201 saves the acquired image data in the recording medium 210. The process then returns to step S1303.

Upon determining in step S1303 that the instruction (mode switching button 1203 or back button in this embodiment) to make transition from the external apparatus operation mode to the external apparatus standby mode is accepted, the process advances to step S1307. In step S1307, the control unit 201 notifies the digital camera 100 of transition from the external apparatus operation mode to the external apparatus standby mode. More specifically, the control unit 201 transmits information representing that the mobile phone 200 has made mode transition to the digital camera 100. The digital camera 100 is set in the camera operation mode outside the simple connection mode. Hence, the digital camera 100 detects it in step S1004 of FIG. 10 described above and automatically makes mode transition in correspondence with the mode transition of the mobile phone 200. When the processing of step S1307 ends, the mobile phone 200 transits to the external apparatus standby mode. The operation of the mobile phone 200 in the external apparatus operation mode has been described above.

As described above, the digital camera 100 according to this embodiment can easily be connected to an already registered device when the connection is performed upon detecting press of the simple connection button 107. Transition to a mode unwanted by the operator can be prevented by limiting the switchable modes.

Note that in this embodiment, the digital camera 100 is configured to directly communicate with the mobile phone 200 by serving as a simple access point and forming a network or via a network formed by an external access point. However, the present invention is not limited to this. For example, a connection form in which the digital camera 100 always forms a network may be employed.

As the procedure of disconnecting the digital camera 100 from the mobile phone 200, the disconnection is done by, for example, ending the camera communication application in the mobile phone 200 or performing a predetermined operation on the digital camera 100. Alternatively, for example, when the digital camera 100 accepts an operation on the release switch, the digital camera 100 may be disconnected from the mobile phone 200 and transit to the shooting mode. This is based on a concept that the primary purpose of the digital camera 100 is image capturing, and higher priority should be given to shooting processing than communication with the mobile phone 200. Note that when transiting to the image capturing mode, the mobile phone 200 is disconnected in order to prevent an image obtained by image capturing from containing noise due to the influence of communication waves with the mobile phone 200.

The present invention has been described above in detail based on the preferred embodiments. However, the present invention is not limited to these specific embodiments and can incorporate various forms without departing from the scope of the present invention. Some of the above-described embodiments may appropriately be combined.

The present invention has been described above in detail based on the preferred embodiments. However, the present invention is not limited to these specific embodiments and can incorporate various forms without departing from the scope of the present invention. The above-described embodiments are merely examples of the present invention and can also appropriately be combined.

In the above-described embodiment, a case in which the present invention is applied to a digital camera has been described as an example. However, the present invention is not limited to this example. That is, the present invention is applicable to any display control apparatus capable of controlling to simultaneously display a plurality of images, such as a digital photo frame or a display provided for selection and confirmation of print images on a personal computer, a PDA, a mobile phone terminal, a portable image viewer, or a printer apparatus.

According to the above-described embodiment, it is possible to save a user from performing user operations when connecting a specific external apparatus as a content transmission destination.

Other Embodiments

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288558, filed Dec. 28, 2012, which is hereby incorporated by reference herein in its entirety.

What is claimed is:

1. A communication apparatus comprising:
an image capturing unit;
a communication unit;
a memory; and
a processor for executing a program stored in the memory, tine program including following steps of:

capturing an object by the image capturing unit and generating image data;

communicating with an external apparatus via the communication unit by a procedure selected from a plurality of procedures, the plurality of procedures including a first procedure in which user operation is input until the communication apparatus and an external apparatus are connected and a second procedure in which user operation which is simpler than the user operation in the first procedure is input until the communication apparatus and an external apparatus are connected, wherein the procedure is selected before connection between the communication apparatus and the external apparatus is established by the communication unit;

operating in a first transmitting anode when the connection with the external apparatus is established via the first procedure;

operating in a second transmitting mode when the connection with the external apparatus is established via the second procedure;

wherein, in the first transmitting mode, a content that is selected based on an operation on the communication apparatus is transmitted and, in the second transmitting mode, a content that is selected based on an operation on an external apparatus is transmitted, wherein the first transmitting mode is executed after establishing the connection between the communication apparatus and the external apparatus and the second transmitting mode is executed after the connection between the communication apparatus and the external apparatus is established by the communication unit, and wherein the contents recorded in a recording medium include the image data generated by the image capturing unit.

2. The apparatus according to claim 1, wherein the program further including a step of, when connecting the external apparatus by the second procedure, prohibiting a switching of the transmitting mode.

3. The apparatus according to claim 1, further comprising a display configured to identifiably display the connection mode of the communication unit.

4. The apparatus according to claim 1, wherein the program including further following step, when connecting the external apparatus by the second procedure, notifying the external apparatus that connection is done in the second procedure.

5. The apparatus according to claim 1, wherein the content is at least one of image data, sound data and the document data.

6. The apparatus according to claim 1, further comprising a touch panel,
wherein, in the first transmitting mode, the touch panel accepts an instruction for selecting the content from a user.

7. The apparatus according to claim 1, further comprising a display,
wherein the processor displays the content on the display and prompts a user to select a content.

8. The apparatus according to claim 1, wherein communication with an external apparatus is performed via wireless LAN network.

9. The apparatus according to claim 1, wherein the processor controls to generate a wireless LAN network by transmitting a beacon signal to the communication unit.

10. The apparatus according to claim 9, further comprising a display, wherein, when the communication unit generates the wireless LAN network, the processor controls so as to display a connection parameter on the display.

11. The apparatus according to claim 10, wherein the connection parameter includes SSID and an encryption key.

12. A method of controlling a communication apparatus including an image capturing unit and a communication unit, the method comprising:

capturing an object by the image capturing unit and generating image data;

communicating with an external apparatus via the communication unit by a procedure selected from a plurality of procedures, the plurality of procedures including a first procedure in which user operation is input until that the communication apparatus and an external apparatus are connected and a second procedure in which user operation which is simpler than the user operation in the first procedure is input until the communication apparatus and an external apparatus are connected wherein the procedure is selected before connection between the communication apparatus and the external apparatus is established by the communication unit;

operating in a first transmitting mode when the connection with the external apparatus is established via the first procedure;

operating in a second transmitting mode when the connection with the external apparatus is established via the second procedure;

wherein, in the first transmitting mode, a content that is selected based on an operation on the communication apparatus is transmitted and, in the second transmitting mode, a content that is selected based on an operation on an external apparatus is transmitted, wherein the first transmitting mode is executed after establishing the connection between the communication apparatus and the external apparatus and the second transmitting mode is executed after he connection between the communication apparatus and the external apparatus is established by the communication unit, and wherein the contents recorded in a recording medium include the image data generated by the image capturing unit.

13. A non-transitory computer-readable storage medium storing a program for controlling a communication apparatus including an image capturing unit and a communication unit, wherein the program causes a computer to execute:

capturing an object by the age capturing unit and generating image data;

communicating with an external apparatus via the communication unit by a procedure selected from a plurality of procedures, the plurality of procedures including a first procedure in which user operation is input until the communication apparatus and an external apparatus are connected and a second connection procedure in which user operation which is simpler than the user operation in the first procedure is input until the communication apparatus and an external apparatus are connected, wherein the procedure is selected before connection between the communication apparatus and the external apparatus is established by the communication unit;

operating in a first transmitting mode when the connection with the external apparatus is established via the first procedure;

operating in a second transmitting mode when the connection with the external apparatus is established via the second procedure;

wherein, in the first transmitting mode a content that is selected based on an operation on the communication apparatus is transmitted and, in the second transmitting mode, a content that is selected based on an operation on an external apparatus is transmitted, wherein the first transmitting mode is executed after establishing the connection between the communication apparatus and the external apparatus and the second transmitting mode is executed after the connection between the communication apparatus and the external apparatus is established by the communication unit, and wherein the contents recorded in a recording medium include the image data generated by the image capturing unit.

14. A communication apparatus comprising:
an image capturing unit;
a communication unit;
a memory; and
a processor for executing a program stored in the program including following steps of:
capturing an object by the image capturing wait and generating image data;
communicating with an external apparatus via the communication unit by a procedure selected from a plurality of procedures, the plurality of procedures including a first procedure and a second procedure which is simpler than the first procedure, herein the procedure is selected before connection between the communication apparatus and the external apparatus is established by the communication unit;
operating in a first transmitting mode when the connection with the external apparatus is established via the first procedure;
operating in a second transmitting mode when the connection with the external apparatus is established via the second procedure;
wherein, in the first transmitting mode, a content that is selected based on an operation on the communication apparatus is transmitted and, in the second transmitting mode, a content that is selected based on an operation on an external apparatus is transmitted,
wherein the first transmitting mode is executed after establishing the connection between the communication apparatus and the external apparatus and the second transmitting mode is executed after the connection between the communication apparatus and the external apparatus is established by the communication unit, and
wherein the contents recorded in a recording medium include the image data generated by the image capturing unit.

15. A communication apparatus comprising:
an image capturing unit configured to capture an object and generate image data;
a communication unit configured to communicate with an external apparatus;
a memory; and
a processor for executing a program stored in the memory, the program including following steps of:
capturing an object by the image capturing unit and generating image data;
communicating with an external apparatus via the communication unit by a procedure selected from a plurality of procedures, the plurality of procedures including a first procedure in which user operation is input until the communication apparatus and an external apparatus are connected and a second procedure in which user operation whose operation amount is smaller than the user operation in the first procedure is input until the communication apparatus and an external apparatus are connected, wherein the procedure is selected before connection between the communication apparatus and the external apparatus is established by the communication unit;
operating in a first transmitting mode when the connection with the external apparatus is established via the first procedure;
operating in a second transmitting mode when the connection with the external apparatus is established via the second procedure;
wherein, in the first transmitting mode, a content that is selected based on an operation on the communication apparatus is transmitted and, in a second transmitting mode, a content that is selected based on an operation on an external apparatus is transmitted,
wherein the first transmitting mode is executed after establishing the connection between the communication apparatus and the external apparatus and the second transmitting mode is executed after the connection between the communication apparatus and the external apparatus is established by the communication unit, and
wherein the contents recorded in a recording medium include the image data generated by the image capturing unit.

16. The apparatus according to claim 15, wherein the program further including a step of, when connecting the external apparatus by the second procedure, prohibiting a switching of the transmitting mode controlling being unable to switch the transmitting mode cannot be switched.

17. The apparatus according to claim 15, further comprising a display configured to identifiably display the connection mode of the connection communication unit.

18. The apparatus according to claim 15, wherein the program including further following step, when connecting the external apparatus by the second procedure, notifying the external apparatus that connection is done in the second connection procedure.

19. The apparatus according to claim 15, wherein the content is at least one of image data, sound data and document data.

20. The apparatus according to claim 15, further comprising a touch panel,
wherein, in the first transmitting mode, the touch panel accepts an instruction for selecting the content from a user.

21. The apparatus according to claim 15, further comprising a display,
wherein the processor displays the content on the display and prompts a user to select a content.

22. The apparatus according to claim 15, wherein the communication h an external apparatus is performed via wireless LAN network.

23. The apparatus according to claim 15, wherein the processor controls to generate a wireless LAN network by transmitting a beacon signal to the communication unit.

24. The apparatus according to claim 23, further comprising a display, wherein, when the communication unit generates the wireless LAN network, the processor controls so as to display a connection parameter on the display.

25. The apparatus according to claim 23, wherein the connection parameter includes SSID and an encryption key.

26. A method of controlling a communication apparatus including an image capturing unit and a communication unit, the method comprising:

capturing an object by the image capturing, unit and generating, image data:

communicating with an external apparatus via the communication unit by a procedure selected from a plurality of procedures, the plurality of procedures including a first procedure in which user operation is input until the communication apparatus and an external apparatus are connected and a second procedure in which user operation whose operation amount is smaller than the user operation in the first procedure is input until the communication apparatus and an external apparatus are connected, wherein the procedure is selected before connection between the communication apparatus and the external apparatus is established by the communication unit;

operating in a first transmitting mode when the connection with the external apparatus is established via the first procedure;

operating in a second transmitting mode when the connection with the external apparatus is established via the second procedure;

wherein, in the first transmitting mode, a content that is selected based on an operation on the communication apparatus is transmitted and, in a second transmitting mode, a content that is selected based on an operation on an external apparatus is transmitted, wherein the first transmitting geode is executed after establishing the connection between the communication apparatus and the external apparatus and the second transmitting mode is executed after the connection between the communication apparatus and the external apparatus is established by the communication unit, and wherein the contents recorded in a recording medium include the image data generated by the image capturing unit.

* * * * *